United States Patent
Perelli

(10) Patent No.: US 11,422,593 B2
(45) Date of Patent: Aug. 23, 2022

(54) COMPUTER DISPLAY SYSTEM

(71) Applicant: Lenovo (Singapore) Pte. Ltd., Singapore (SG)

(72) Inventor: Thomas Perelli, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/086,369

(22) Filed: Oct. 31, 2020

(65) Prior Publication Data
US 2022/0137672 A1    May 5, 2022

(51) Int. Cl.
*G06F 1/16*    (2006.01)

(52) U.S. Cl.
CPC .......... *G06F 1/1681* (2013.01); *G06F 1/1616* (2013.01); *G06F 1/1683* (2013.01)

(58) Field of Classification Search
CPC .... G06F 1/1601; G06F 1/1607; G06F 1/1613; G06F 1/1615; G06F 1/1616; G06F 1/1632; G06F 1/1681
See application file for complete search history.

(56) References Cited

U.S. PATENT DOCUMENTS

| | | | | |
|---|---|---|---|---|
| 6,078,407 | A * | 6/2000 | Ma | G06F 1/1616 358/474 |
| 6,266,241 | B1 * | 7/2001 | Van Brocklin | G06F 1/1616 361/679.46 |
| 10,139,862 | B1 * | 11/2018 | Nakamura | G06F 1/1669 |
| 2010/0053876 | A1 * | 3/2010 | Widmer | G06F 1/1632 361/679.27 |
| 2014/0139980 | A1 * | 5/2014 | Horii | G06F 1/166 361/679.01 |
| 2016/0048176 | A1 * | 2/2016 | Saito | G06F 1/1681 361/679.27 |
| 2018/0014645 | A1 * | 1/2018 | McCrate | G06F 1/1647 |
| 2021/0333839 | A1 * | 10/2021 | Yao | G06F 1/1681 |
| 2021/0337684 | A1 * | 10/2021 | Pyo | H05K 5/0017 |

OTHER PUBLICATIONS

Microsoft Corp., Surface Studio 2 for Business, https://www.microsoft.com/en-us/surface/business/surface-studio-2, accessed Sep. 27, 2020, (Release Date for Surface Studio 2, Oct. 2, 2018) (5 pages).

* cited by examiner

*Primary Examiner* — Anthony Q Edwards
(74) *Attorney, Agent, or Firm* — Brian J. Pangrle

(57) ABSTRACT

A system can include a display housing that includes a planar display; a planar stand; and a hinge assembly that operatively couples the display housing and the planar stand and that includes an accessory socket that defines a plane that is maintained fixed for rotation of the display housing with respect to the planar stand.

20 Claims, 17 Drawing Sheets

COMPUTER DISPLAY SYSTEM

TECHNICAL FIELD

Subject matter disclosed herein generally relates to computer display systems.

BACKGROUND

A computer system can include a housing with a display where the computer system can render to the display for viewing by a user.

SUMMARY

A system can include a display housing that includes a planar display; a planar stand; and a hinge assembly that operatively couples the display housing and the planar stand and that includes an accessory socket that defines a plane that is maintained fixed for rotation of the display housing with respect to the planar stand. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
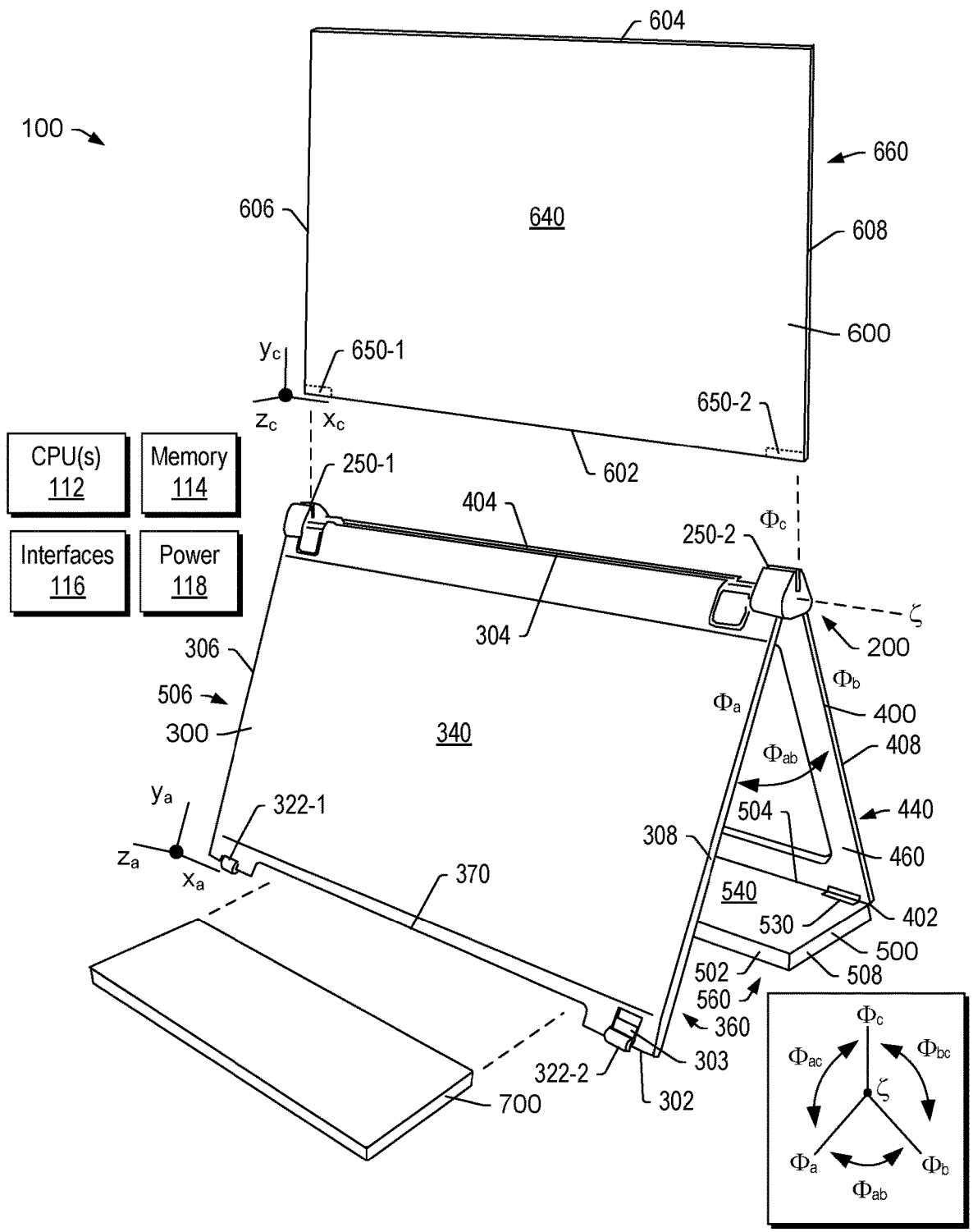
FIG. 1 is a perspective view of an example of a system.

FIG. 1 shows an example of a computer display system 100 that includes a hinge assembly 200 that can operatively couple two or more components. For example, the hinge assembly 200 can operatively couple a display housing 300 to a stand 400. In such an example, the display housing 300 can define a first plane in a Cartesian coordinate system $x_a$, $y_a$ and $z_a$ (e.g., an $x_a$, $y_a$-plane), denoted "a" with an angle $\Phi_a$ about an axis $\zeta$, and the stand 400 can define a second plane in a Cartesian coordinate system $x_b$, $y_b$ and $z_b$ (e.g., an $x_b$, $y_b$-plane), denoted "b" with an angle $\Phi_b$ about an axis $\zeta$, where an angle $\Phi_{ab}$ between the first plane and the second plane is adjustable via the hinge assembly 200. In the example of FIG. 1, the display housing 300 includes a lower edge 302, an upper edge 304, opposing side edges 306 and 308, and opposing front and back surfaces 340 and 360, respectively, where the front surface 340 is a display surface. In the example of FIG. 1, the stand 400 includes a lower edge 402, an upper edge 404, opposing side edges 406 and 408, and opposing front and back surfaces 440 and 460, respectively.

In the example of FIG. 1, where the lower edge 402 of the stand 400 is in a fixed position (e.g., on a tabletop, a desktop, a countertop, etc.), which may be through use of a component 500, the angle $\Phi_{ab}$ between the first plane and the second plane can be increased to extend the lower edge 302 of the display housing 300 away from the lower edge 402 of the stand 400 such that the lower edge 302 of the display housing 300 may be closer to a user. In so doing, a height of the hinge assembly 200 (e.g., on a tabletop, a desktop, a countertop, etc.) can be decreased. Where a second display housing 600, which can define a third plane in a Cartesian coordinate system $x_c$, $y_c$ and $z_c$ (e.g., an $x_c$, $y_c$-plane), denoted "c" with an angle $\Phi_c$ about an axis $\zeta$, is operatively coupled to the hinge assembly 200, the height of a lower edge 602 of the second display housing 600 may be lowered as well. In such an example, the second display housing 600 may remain at a fixed angle (e.g., the angle $\Phi_c$ about the axis $\zeta$) during the adjustment that increases the angle $\Phi_{ab}$. As an example, the second display housing 600 may optionally be adjustable as to its angle $\Phi_c$ about the axis $\zeta$, which may be measured with respect to gravity, a horizon, a tabletop, a desktop, a countertop, etc.

As shown in the example of FIG. 1, the display housing 300 can include one or more anti-friction components 322-1 and 322-2 at the lower edge 302 that can facilitate movement of the display housing 300 on a surface, for example, as to one or more adjustments as to the position of the display housing 300 on the surface, which may include an adjustment to the angle $\Phi_{ab}$. As an example, an anti-friction component can be a roller supported by a socket, an axle, axles, etc. As an example, a roller may be round, spherical, oval, oblate, etc. As an example, an anti-friction component can be a low friction material such as a low friction polymeric material that can readily slide on a surface with a relatively low coefficient of friction. As an example, the hinge assembly 200 can provide force that is sufficient to maintain an orientation of the display housing 300 with respect to the stand 400. As an example, the hinge assembly 200 can provide frictional force using one or more of gears, friction hinge components, etc. As an example, the one or more anti-friction components 322-1 and 322-2 can allow for adjusting the display housing 300 without lifting the display housing 300 off of a surface. As an example, the display housing 300 may be adjustable using a single finger, for example, to pull the lower edge 302 forward (e.g., to decrease the angle $\Phi_{ab}$) or to push the lower edge 304 backward (e.g., to decrease the angle $\Phi_{ab}$). Where a user desired to reposition the stand 400, it may be lifted from a surface (e.g., a tabletop, a desktop, a countertop, etc.).

As an example, the display housing 300 may include one or more features at the lower edge 302. For example, consider a rubberized feature, which may include one or more rubberized components and/or finishes fixed to the lower edge 302 that can provide for frictional force against a surface such that the lower edge 302 resists sliding forward. As an example, the display housing 300 may include one or more locking mechanisms 303 that can lock one or more rollers if present at the lower edge 302. For example, consider a latch that can lock a roller in position about an axle where the latch may be finger operated to slide or flip between a latched position and an unlatched position. As an example, a latch may be akin to a latch on a desk wheel, a rolling shelve wheel, etc., which tend to be operable via a foot and/or a hand. In such an example, a user may latch one or more rollers to reduce risk of the lower edge 302 of the display housing 300 moving outwardly under force of gravity. As an example, a roller may be rubberized (e.g., a rubber wheel, a rubber coated wheel, etc.) such that frictional force can be increased when latched to help reduce risk of movement on a support surface. As mentioned, one or more hinge assemblies, etc., may provide frictional force that can help reduce risk of undesirable movement during use, for example, such that the lower edge 302, being on a support surface, does not unintentionally move during use.

In the example of FIG. 1, the locking mechanism 303 may be provided as a sliding mechanism that slides with respect to a guide where, in a latched state, a slider may be spring-biased by a spring, etc., to apply force against the roller 322-2 and where, in an unlatched state, the slider may be held in a position to not be in contact with the roller 322-2, for example, by a notch, etc. In such an example, a user may utilize a finger to transition the locking mechanism 303 from one state to the other.

As shown in the example of FIG. 1, the second display housing 600 can include an upper edge 604, opposing side edges 606 and 608, and opposing front and back surfaces 640 and 660, respectively, where at least the front surface 640 is a display surface. As an example, the second display housing 600 may be a dual-sided display housing with the front surface 640 being a front display surface and the back surface 660 being a back display surface.

In the example of FIG. 1, the hinge assembly 200 can include one or more sockets 250-1 and 250-2 that can include one or more connectors, which can be one or more electrical connectors. As an example, the display housing 600 can include one or more connectors 650-1 and 650-2 that can be one or more electrical connectors. In such an example, the display housing 600 may be received by the one or more sockets 250-1 and 250-2 to establish an electrical connection between circuitry of the display housing 600 and other circuitry of the system 100. In such an example, the electrical connection can provide for transmission and/or receipt of electrical power and/or data.

In the example of FIG. 1, a keyboard housing 700 can be included in the system 100 where, for example, the display housing 300 can include a shaped profile with an elongated notch or cutout 370 that provides a clearance sufficient for passage of the keyboard housing 700. In the example of FIG. 1, the cutout 370 is disposed between the two anti-friction components 322-1 and 322-2. In such an example, the keyboard housing 700 may be passed underneath the display housing 300 via the cutout 370 to move the keyboard housing 700 from a position in front of the display housing 300 to a position behind and/or underneath the display housing 300. As an example, where the angle $\Phi_{ab}$ is increased, the display housing 300 may pass over at least a portion of the keyboard housing 700. For example, as mentioned, a user may utilize a finger or fingers to pull the lower edge 302 of the display housing 300 forward such that the angle $\Phi_{ab}$ is increased where the lower edge 302 along the cutout 370 passes over the keyboard housing 700, which can include a keyboard with depressible keys.

As shown in FIG. 1, the various angles can be defined with respect to the axis $\zeta$ (e.g., $\Phi_a$, $\Phi_b$, $\Phi_c$, $\Phi_{ab}$, $\Phi_{bc}$ and $\Phi_{ac}$). In such an example, the hinge assembly 200 can be a three-plane hinge assembly where adjustments can be made to at least two of the planes (e.g., where the planes can correspond to respective components that can be operatively coupled, directly and/or indirectly, to the hinge assembly 200). As an example, the hinge assembly 200 may include features that provide for adjustments to three of three planes. As an example, the display housing 600 may include a hinge assembly at its lower edge 602 that can be utilized for adjusting the angle of the display housing 600 (e.g., the angle $\Phi_c$) with respect to the axis $\zeta$. As an example, an accessory can include a hinge assembly where the accessory may be received via the sockets 250-1 and 250-2 and may replicate such sockets for receipt of the display housing 600, where such replication may include providing for electrical connection(s). In such an example, the accessory can make the display housing 600 adjustable as to its angle (e.g., the angle $\Phi_c$) with respect to the axis $\zeta$.

As an example, a system can include: a display housing that includes a planar display; a planar stand; and a multi-plane hinge assembly that operatively couples the display housing and the planar stand and that includes at least one accessory socket. For example, in FIG. 1, the system 100 includes the display housing 300, the planar stand 400 and the hinge assembly 200 as a multi-plane hinge assembly that operatively couples the display housing 300 and the planar stand 400 and where the multi-plane hinge assembly includes the one or more sockets 250-1 and 250-2, which may receive a component such as the display housing 600 as an accessory and/or another type of component as an accessory. In such an example, the display housing 600 can include a planar display such that the multi-plane hinge assembly is a three-plane hinge assembly where at least two of the three planes are adjustable via the three-plane hinge assembly (e.g., adjustable with respect to the axis $\zeta$).

As an example, a system can include a display housing that includes a planar display; a planar stand; and a hinge assembly that operatively couples the display housing and the planar stand and that includes an accessory socket that defines a plane that is maintained fixed for rotation of the display housing with respect to the planar stand. For example, the system 100 can include the display housing 300 that includes a planar display, the stand 400 as a planar stand, and the hinge assembly 200 as operatively coupling the display housing 300 and the stand 400 where the hinge assembly 200 includes the one or more sockets 250-1 and 250-2 as accessory sockets that can define a plane where that plane can be maintained fixed for rotation of the display housing 300 with respect to the stand 400.

In the example of FIG. 1, the component 500 includes opposing edges 502 and 504, opposing side edges 506 and 508 (e.g., in the perspective view of FIG. 1, the side edge 506 being hidden behind the display housing 300), and opposing surfaces 540 and 560, where the surface 560 may be a support surface that can support the stand 400. As an example, a hinge assembly 530 may operatively couple the component 500 to the stand 400 such that the system 100 includes multiple hinge assemblies (e.g., the hinge assembly 200 being a first hinge assembly and the hinge assembly 530 being a second hinge assembly). As an example, the component 500 can be characterized using one or more coordinate systems such as, for example, a Cartesian coordinate system $x_d$, $y_d$ and $z_d$ where the component 500 may define a plane (e.g., an $x_d$, $y_d$-plane).

As shown in the example of FIG. 1, the system 100 can include one or more processors 112, memory 114 (e.g., one or more memory devices), one or more interfaces 116, and one or more power cells 118. Such components may be, for example, carried by or within one or more of the hinge assembly 200, the display housing 300, the stand 400, the component 500, the display housing 600 and the keyboard housing 700. As an example, the component 500 can include one or more of the one or more processors 112, at least a portion of the memory 114, one or more of the one or more interfaces 116 and one or more of the one or more power cells 118. In such an example, circuitry may operatively couple the component 500 to one or more of the hinge assembly 200, the display housing 300, the stand 400, the display housing 600, the keyboard housing 700 and/or one or more other components, which may be one or more accessories. As explained, an accessory may include structural features that allow the accessory to be physically coupled to the hinge assembly 200. In such an example, one or more electrical connections may be made between the hinge assembly 200 and the accessory, which may provide for transmission and/or reception of one or more of power and data.

Figure 2:
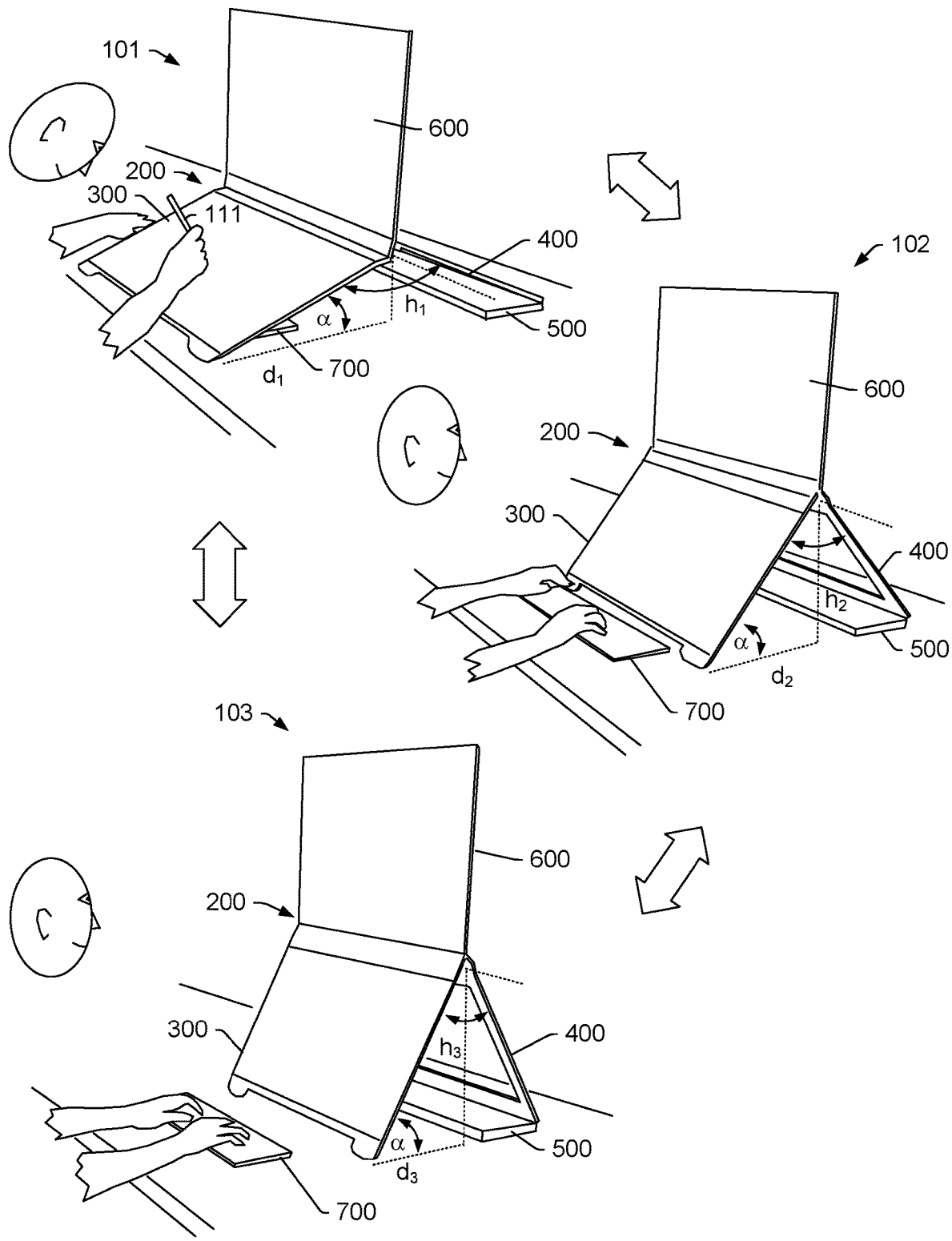
FIG. 2 is a series of perspective views of an example of a system and examples of methods.

FIG. 2 shows diagrams that illustrate three different orientations 101, 102 and 103 of the system 100 of FIG. 1 with respect to a user where various example methods (see, e.g., double-headed arrows) may be utilized for transitions between two or more of the orientations 101, 102 and 103 of the system 100. The orientations 101, 102 and 103 are illustrated with corresponding dimensions of height "h" and distance "d" as to two legs of a triangle defined with respect to the hinge assembly 200 and the display housing 300, $h_1$, $d_1$, $h_2$, $d_2$, and $h_3$, $d_3$, which can be defined with corresponding values of the angle $\Phi_{ab}$ (see, e.g., FIG. 1). As shown in FIG. 2, a reciprocal relationship exists between h and d ($h_1 < h_2 < h_3$ and $d_1 > d_2 > d_3$), which as mentioned, may be two legs of a triangle. In such an example, one internal angle can be approximately one half of $\Phi_{ab}$ while another internal angle may be 90 degrees. In such an example, the third internal angle, α, may be determined as follows: α=180 degrees−90 degrees−$\Phi_{ab}$. As shown, the angle α may be adjusted for an orientation suitable for one or more user scenarios.

As an example, the system 100 can be adjustable such that the display housing 300 is disposed at an angle α with respect to a tabletop, a desktop, a countertop, etc., where the angle α may be in a range of approximately 0 degrees to approximately 89 degrees. As an example, the orientation 101 can be a content creator orientation where the front surface 340 can be a touch-screen surface that may be a digitizer surface for use with a stylus 111. As an example, a content creator orientation can be in a range of angles of a from approximately 0 degrees to approximately 50 degrees.

FIG. 2 also shows approximate positions of a user's head. As shown in the orientation 101, the user is drawing on the display housing 300 with the user's head closer to the user's drawing hand, as shown holding the stylus 111. In such an example, the user may glance or gaze slightly forward to see information rendered to the display housing 600. In comparison, consider the orientation 103, where the display housing 600 is positioned further back and higher. If multiple display housing system with a lower display housing and an upper display housing did not have the upper display housing move forward and downward where the lower display was to be used for drawing by a user, then the user would have to strain to see the upper display housing. For example, the user would have to move her eyes quite far upwardly in their sockets and/or the user would have to move her head via her neck. Thus, as shown in FIG. 2, where a system can provide for simultaneous movement (e.g., synchronous movement) of two display housings upon transitioning a lower one of the display housings to a suitably acceptable drawing angle (e.g., approximately 5 to 35 degrees with respect to a desktop, etc.), a user may readily a display of each of display housings, for example, by merely adjusting her gaze, without having to move her neck. Further, as the distances between the user's eyes and each of the displays of the display housings may be within a relatively short range, the user's eyes may have to work less hard in adjusting focus and/or a user's short range glasses may suffice for seeing information rendered to each of the displays.

As an example, the orientation 103 may provide for rendering to the display housings 300 and 600 in a manner to create an effectively continuous display surface. As shown, a user's head may be relatively upright where the two display housings 300 and 600 are at about the same distance from the user's eyes and approaching a common plane. In the example orientation 102, the display housing 300 may optionally be utilized for supplemental information. For example, consider the display housing 600 being utilized as a main display for viewing information while a user may glance slightly downwardly to view supplemental information of the display housing 300.

Figure 3:
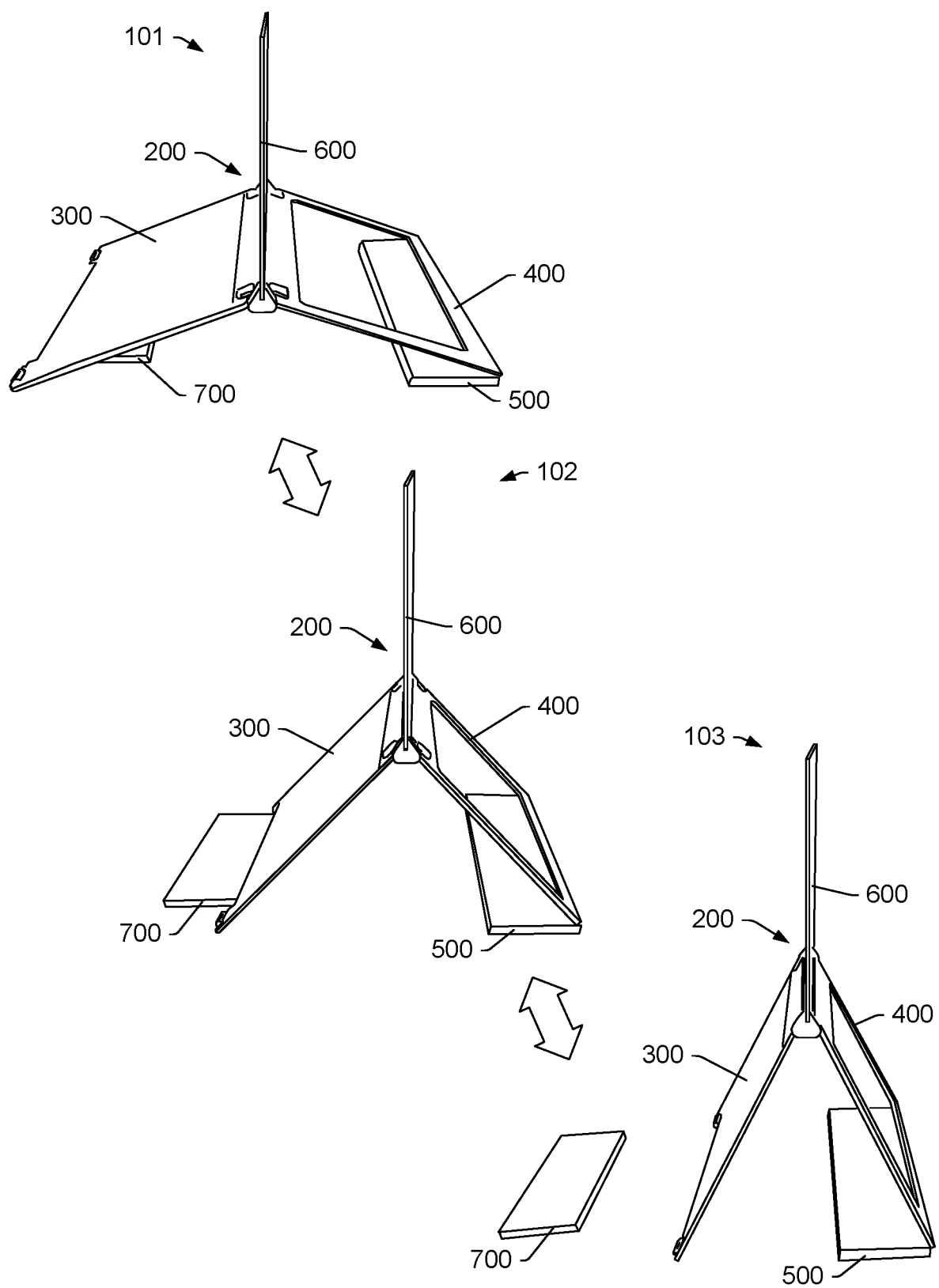
FIG. 3 is a series of perspective views of an example of a system and examples of methods.

FIG. 3 shows perspective view of the example orientations 101, 102 and 103 of FIG. 2 where various example methods (see, e.g., double-headed arrows) may be utilized for transitions between two or more of the orientations 101, 102 and 103 of the system 100. As explained, a system may provide for various orientations, which may be functional and/or ergonomic for one or more types of tasks to be performed by a user. As explained, a user may transition such a system between orientations, for example, without having to get up from a seated position. As explained, an orientation may provide for functionality that involves a user assuming a particular body position. As explained, drawing can involve a user bringing her head closer to her drawing hand, which may provide for more accurate control of a stylus for performing one or more drawing tasks (e.g., content creation, content editing, etc.).

FIG. 4A, FIG. 4B, FIG. 4C, FIG. 4D, FIG. 4E and FIG. 4F show various examples of accessories 810, 820, 830, 840, 850 and 860, respectively, that may be utilized with a hinge assembly such as the hinge assembly 200.

Figure 4A:
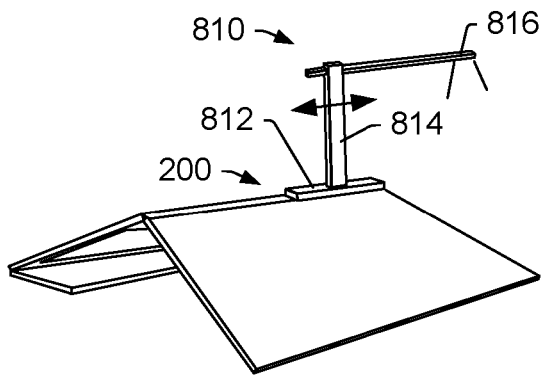
FIG. 4A, FIG. 4B, FIG. 4C, FIG. 4D, FIG. 4E and FIG. 4F are a series of perspective views of examples of systems.

As shown in FIG. 4A, the accessory 810 includes a base 812, an arm 814 that extends from the base 812 and includes a light 816 (e.g., an LED, etc.). In such an example, the accessory 810 may be utilized for task lighting.

Figure 4B:
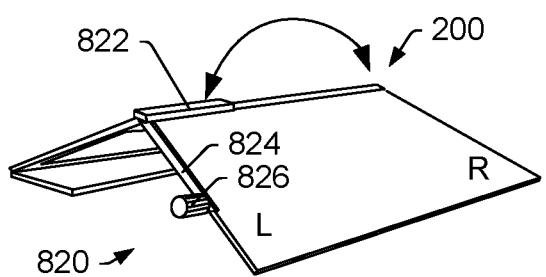

As shown in FIG. 4B, the accessory 820 includes a base 822, an arm 824 that extends from the base 822 and includes a human input device 826 (e.g., a wheel, optionally with one or more buttons, etc.). In such an example, the accessory 820 may be utilized to control one or more aspects of a system.

Figure 4C:
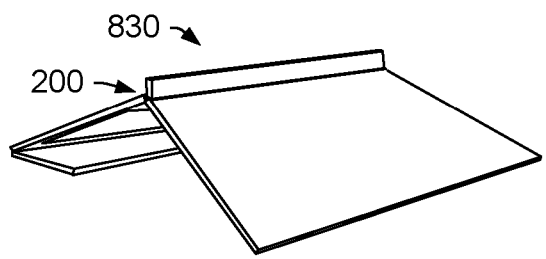

As shown in FIG. 4C, the accessory 830 is a speaker unit, which may include one or more audio drivers and circuitry. In such an example, the circuitry can include wired and/or wireless circuitry. As an example, the accessory 830 may include one or more batteries, which may include one or more rechargeable batteries. As an example, the hinge assembly 200 can include wired and/or wireless charging circuitry where, for example, a battery or batteries of an accessory can be charged, which may provide for use of an accessory in an attached state and/or a detached state from a system, optionally where the system is powered off or otherwise in a low power state.

Figure 4D:
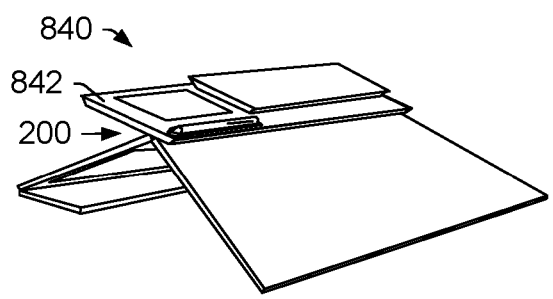

As shown in FIG. 4D, the accessory 840 includes a platform surface 842, which may be utilized as a shelf for holding and/or storage of one or more components such as a stylus, a keyboard, a mouse, etc. As an example, the platform surface 842 may include a HID such as, for example, a keyboard, a touch pad, etc. As an example, the accessory 840 may include wired and/or wireless charging circuitry where, for example, a battery or batteries of a component can be charged.

Figure 4E:
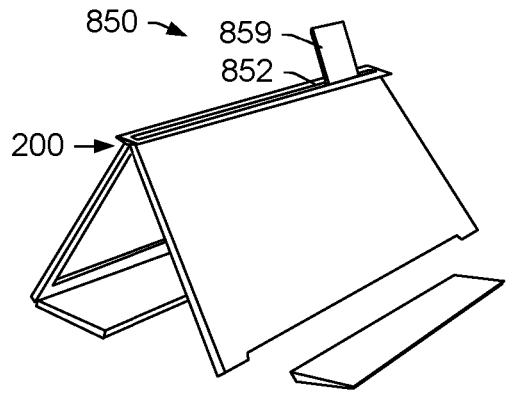

As shown in FIG. 4E, the accessory 850 includes a slot 852 that can be utilized to position a mobile device 859, which may be, for example, a smart phone, etc. As an example, the accessory 850 may include wired and/or wireless charging circuitry where, for example, a battery or batteries of a component can be charged. As an example, the slot 852 can include an interface that may be a wired and/or a wireless interface for transfer or power and/or data (e.g., to and/or from the mobile device 859).

Figure 4F:
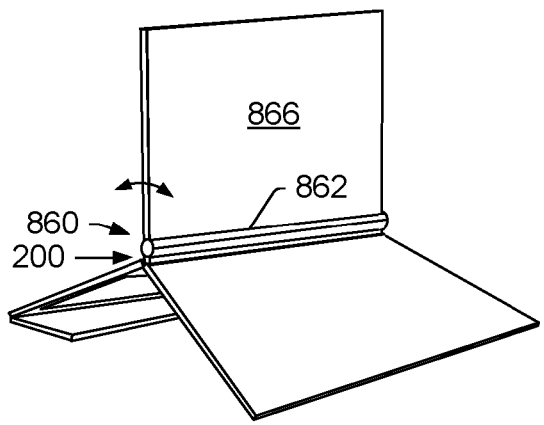

As shown in FIG. 4F, the accessory 860 includes a hinge assembly 862 that can be utilized for adjusting an angle of a display component 866. In such an example, the display component 866 may be a tablet computing device, an auxiliary display device, etc. As an example, the accessory 860 can include circuitry that can operatively couple the display component 866 to other circuitry (e.g., of one or more components of a system).

Figure 5A:
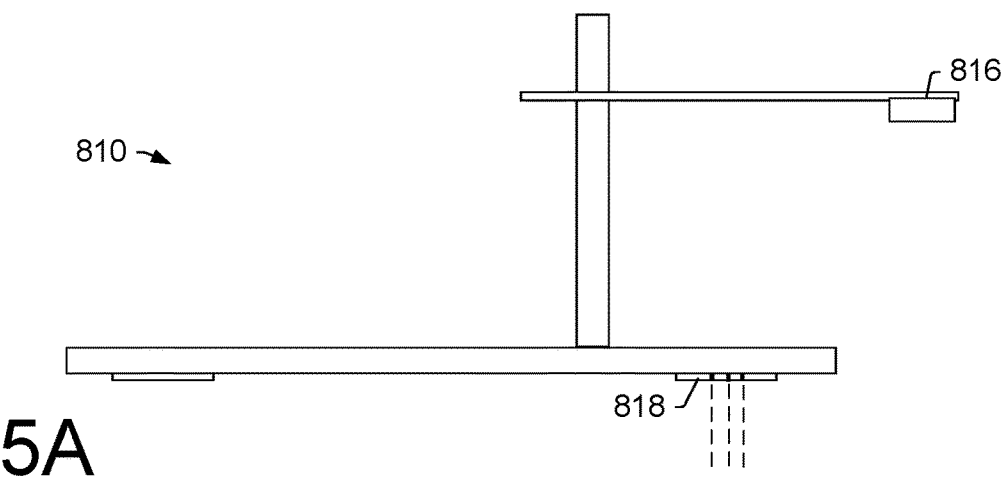
FIG. 5A, FIG. 5B, FIG. 5C and FIG. 5D are a series of plan views of examples of accessories.
Figure 5B:
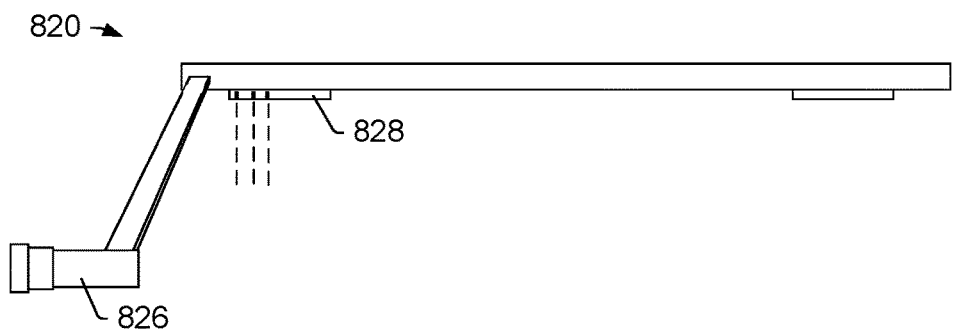
Figure 5C:
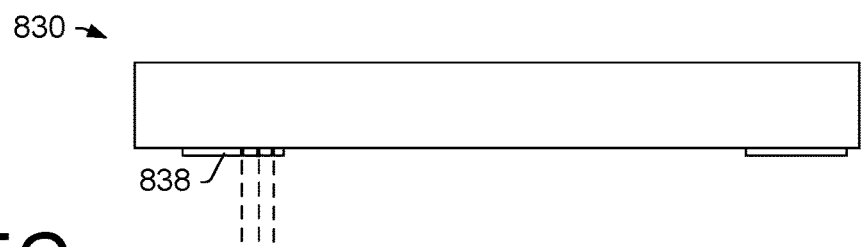
Figure 5D:
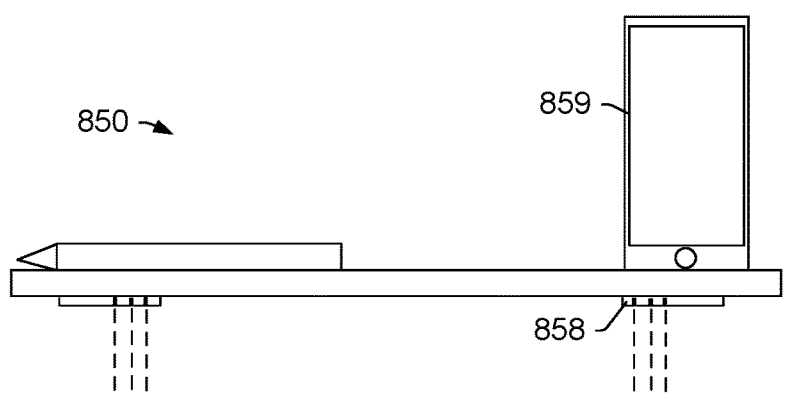

FIG. 5A, FIG. 5B, FIG. 5C and FIG. 5D show views of examples of the accessories 810, 820, 830, and 850 of FIG. 4A, FIG. 4B, FIG. 4C and FIG. 4E, respectively. As shown in FIG. 5A, the accessory 810 can include an interface 818 that can be electrically coupled to the light 816. As shown in FIG. 5B, the accessory 820 can include an interface 828 that can be electrically coupled to the HID 826. As shown in FIG. 5C, the accessory 830 can include an interface 838 that can be electrically coupled to one or more speakers and/or audio circuitry. As shown in FIG. 5D, the accessory 850 can include an interface 858 that can be electrically coupled to the mobile device 859.

Figure 6:
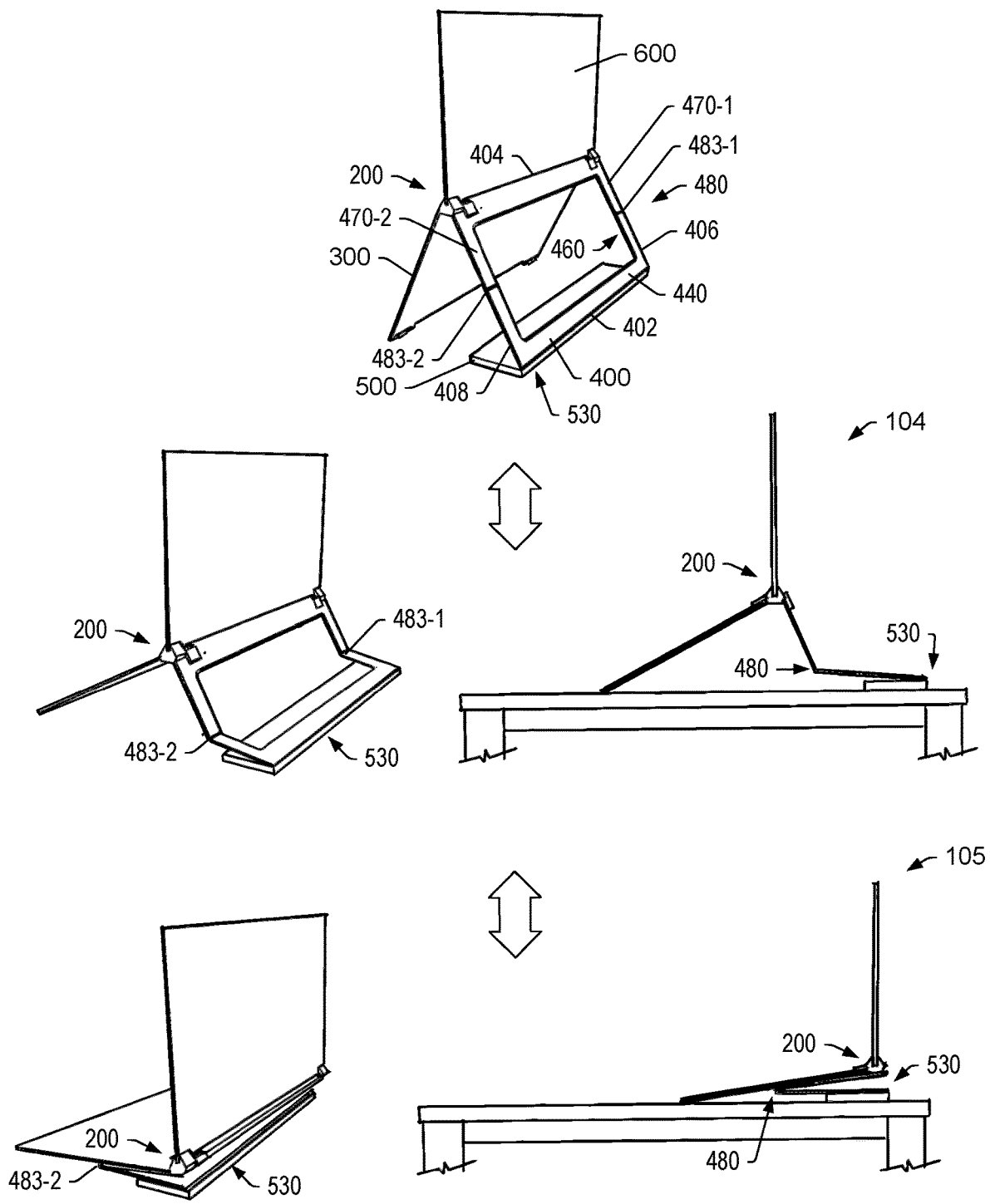
FIG. 6 is a series of perspective views of an example of a system and examples of methods.

FIG. 6 shows an example of the system 100 of FIG. 1 where the stand 400 includes a hinge assembly 480 and where various example methods (see, e.g., double-headed arrows) can provide for various transitions. For example, the stand 400 can include a hinge assembly 480 for one or more braces 470-1 and 470-2 where each of the one or more braces 470-1 and 470-2 can include a corresponding hinge 483-1 and 483-2 of the hinge assembly 480. In such an example, the system 100 may be oriented in various types of orientations. For example, consider an orientation 104 and an orientation 105. In the orientations 104 and 105, the one or more braces 470-1 and 470-2 are folded where the orientation 105 is a more folded orientation than the orientation 104. As shown, the orientation 105 has a smaller footprint than the orientation 104.

As an example, a system may be orientable in various orientations where such orientations can have an associated footprint, which may occupy a certain amount of space (e.g., space of a tabletop, a desktop, a countertop, etc.). As an example, where a user desires workspace, the user may orient a system such as the system 100 to reduce a footprint of the system to free-up workspace.

Figure 7:
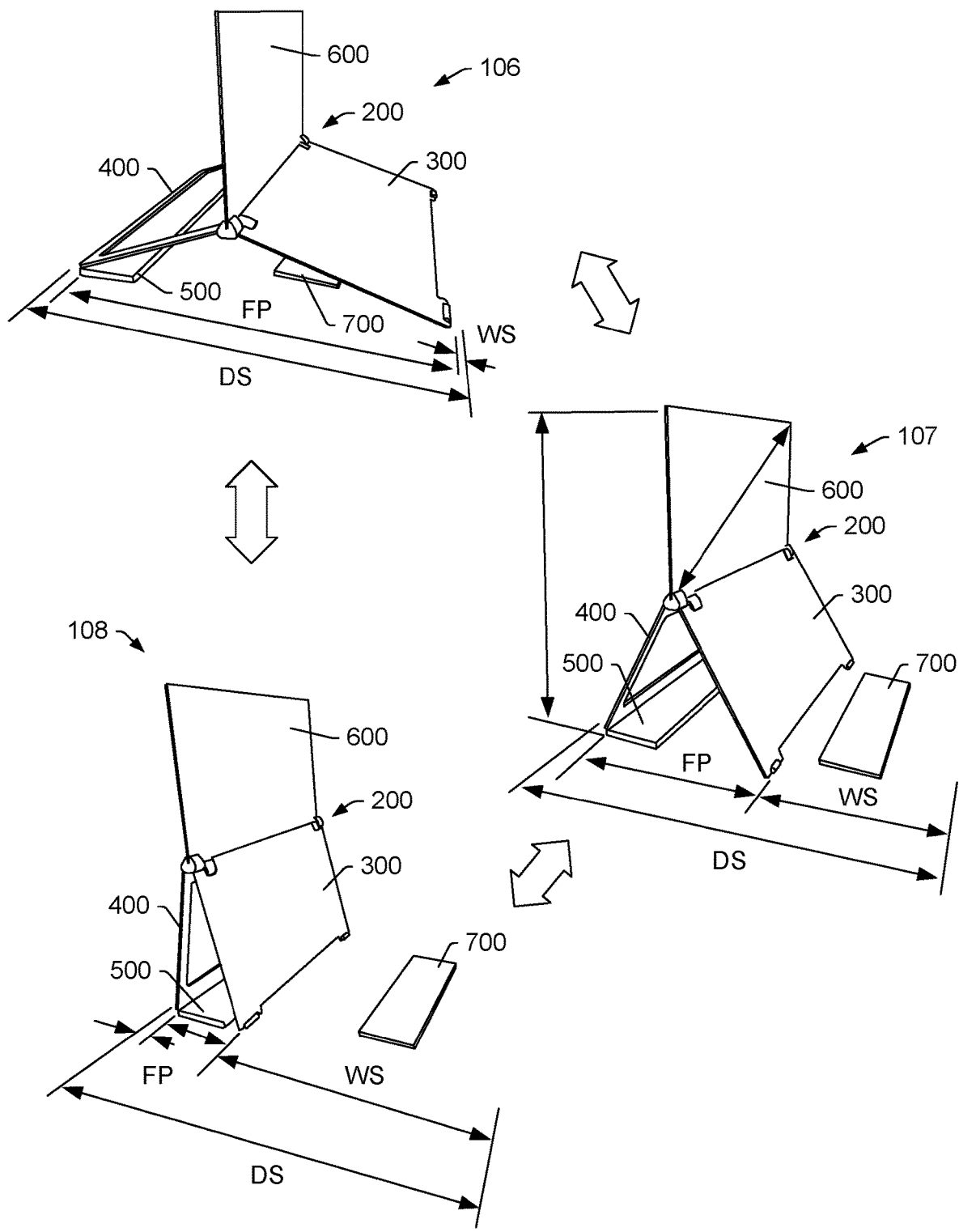
FIG. 7 is a series of perspective views of an example of a system and examples of methods.

FIG. 7 shows the system 100 in various orientations 106, 107 and 108, where various example methods (see, e.g., double-headed arrows) can provide for transitions between orientations. FIG. 7 also shows various dimensions, including a footprint dimension, FP, a desktop dimension, DS, and a workspace dimension, WS. As shown, the footprint is adjustable to provide for a desired amount of workspace. In the orientation 106, the dimension WS is at or near a minimum with respect to DS while in the orientation 108, the dimension WS is at or near a maximum with respect to DS.

Figure 8:
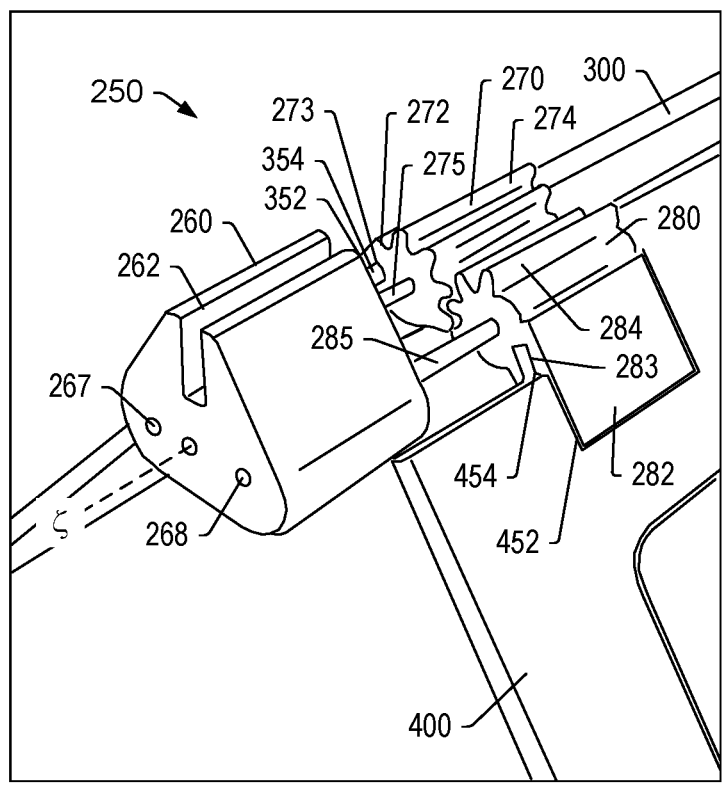
FIG. 8 is a series of perspective views of an example of a portion of a hinge assembly.
Figure 8:
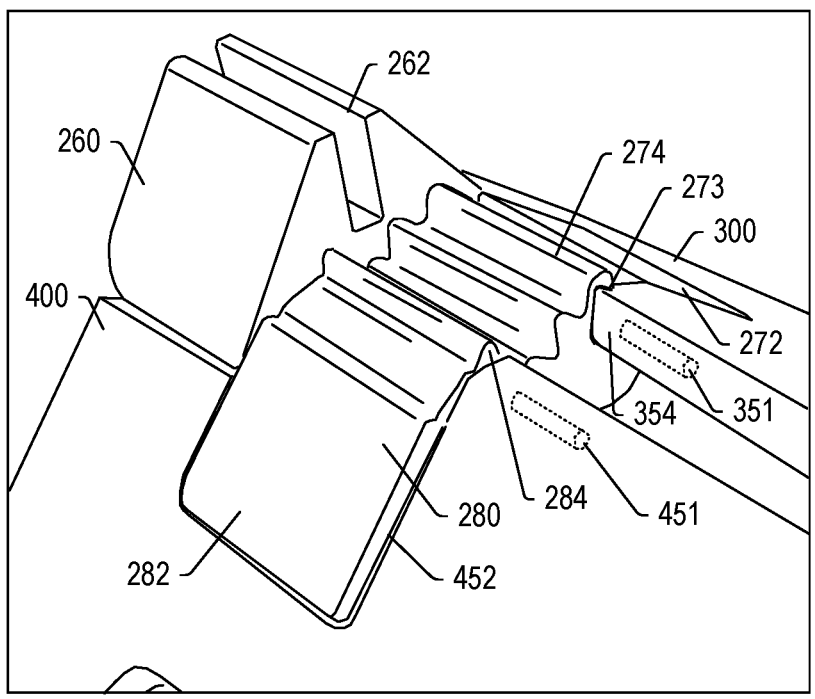

FIG. 8 shows an example of a portion 250 of the hinge assembly 200 as in FIG. 1. As shown in the example of FIG. 8, the portion 250 includes a socket body 260 with a substantially pear-shaped cross-section, for example, as defined in part by a pear curve, a piriform curve, a teardrop curve, etc., which can be characterized as having a base portion and a stem portion. As shown, the socket body 260 can include a longitudinal socket 262 in the stem portion and axle bores 267 and 268 in the base portion. In such an example, the longitudinal socket 262 can define a plane. As explained, one or more types of accessories may be provided and be receivable via the longitudinal socket 262.

As an example, a socket may be a cylindrical socket that may receive a peg. For example, consider the one or more sockets 250-1 and 250-2 of FIG. 1 as including features that are planar, cylindrical and/or another shape for receipt of one or more corresponding features of an accessory. In such an example, the features of the one or more sockets can define a plane. For example, the one or more sockets may determine an orientation of an accessory where the accessory can be maintained in a fixed orientation for rotation of the display housing 300 with respect to the stand 400. As an example, a hinge assembly may include one or more sockets that allow for rotation of an accessory independent of rotation of the display housing 300 with respect to the stand.

For convenience, the axis z is illustrated, which may be offset from the axle bores 267 and 268 (e.g., optionally between the axle bores 267 and 268). In the example of FIG. 8, the portion 250 also includes gear bodies 270 and 280 where the gear body 270 is coupled to the display housing 300 and where the gear body 280 is coupled to the stand 400. As shown, the gear body 270 is rotational about an axle 275 that is supported by the axle bore 267 of the socket body 260 and an axle bore 351 of the display housing 300 (see, e.g., dotted line) and the gear body 280 is rotational about an axle 285 that is supported by the axle bore 268 and an axle bore 451 of the stand 400 (see, e.g., dotted line).

As an example, the gear body 270 may be fit to the display housing 300 using various features such as, for example, a support plate 272 that includes a geared portion 274 where the support plate 272 and the display housing 300 include one or more keys and one or more keyways.

As an example, the gear body 280 may be fit to the stand 400 using various features such as, for example, a support plate 282 that includes a geared portion 284 where the support plate 282 and the stand 400 include one or more keys and one or more keyways.

As an example, the display housing 300 can include a recess 352 and a key 354 where the gear body 270 includes a keyway 273 that can receive the key 354. In such an example, the recess 352 can define a portion of the key 354 where a keyway wall of the keyway 273 can sit at least in part in the recess 352, which may help to provide lateral support such that the gear body 270 does not move axially. As shown, the axle 275 can pass through the gear body 270 and pass into the axle bore 351, which may also help to support the gear body 270, along with the socket body 260.

As an example, the stand 400 can include a recess 452 and a key 454 where the gear body 280 includes a keyway 283 that can receive the key 454. In such an example, the recess 452 can define a portion of the key 454 where a keyway wall of the keyway 283 can sit at least in part in the recess 452, which may help to provide lateral support such that the gear body 280 does not move axially. As shown, the axle 285 can pass through the gear body 280 and pass into the axle bore 451, which may also help to support the gear body 280, along with the socket body 260.

As shown in the example of FIG. 8, the socket body 260 may be supported by the axles 275 and 285 as well as help to space the axles 275 and 285. As shown, the geared portion 274 and 284 can mesh to provide for rotation of the display housing 300 with respect to the stand 400, for example, to adjust the angle $\Phi_{ab}$, which may adjust a footprint defined at least in part by the display housing 300 and the stand 400.

Figure 9:
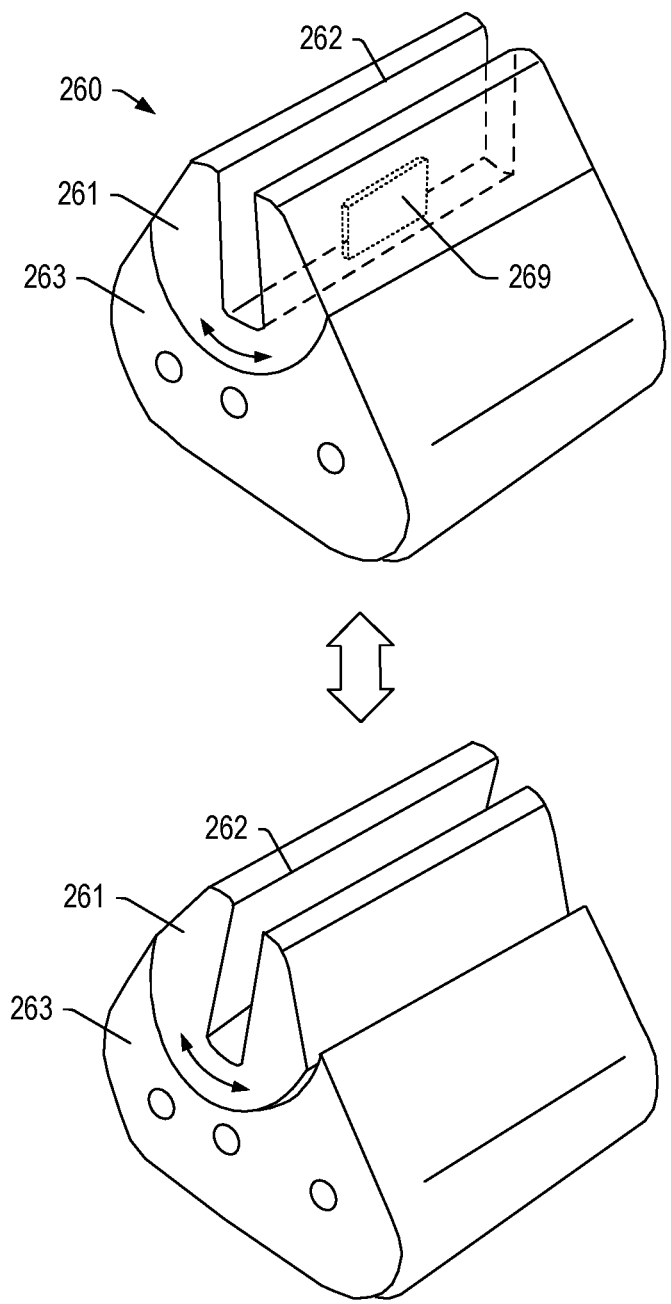
FIG. 9 is a series of perspective views of an example of a portion of a hinge assembly and an example of a method.

FIG. 9 shows an example of the socket body 260 that includes a rotatable portion 261 and a base portion 263 where the rotatable portion 261 can be a stem portion of a substantially pear-shaped cross-section of the socket body 260 where, for example, as indicated by a double-headed arrow, a method can include rotating the rotatable portion 261 with respect to the base portions 263, the latter of which may be stationary during such rotating. As shown, the rotatable portion 261 may also include a substantially pear-shaped cross-section where a portion thereof may be defined in part by a radius and where the base portion 263 can include a socket for the rotatable portion 261, which may be cylindrically shaped, for example, defined in part by the radius such that the rotatable portion 261 can be received in the socket of the base portion 263, which can provide for rotation of the rotatable portion 261, which can thereby rotate the orientation of the longitudinal socket 262, which may be a slot. Referring again to the example system 100 of FIG. 1, the example approach illustrated in FIG. 9 can provide for adjustment of the display housing 600 via the hinge assembly 200. As an example, one or more of the sockets 250-1 and 250-2 of the hinge assembly 200 may optionally be provided as a rotatable socket. In such an example, a rotatable socket may be rotatable independent of rotation of the display housing 300 and the stand 400. As mentioned with respect to FIG. 8, a socket can be an accessory socket that defines a plane. As shown in FIG. 9, rotation of the rotatable portion 261 can rotate a plane. For example, a plane can be defined as being a rotated plane via rotation of the rotatable portion 261.

FIG. 9 also shows various dotted lines that represent an example of a male connector 269, which may be disposed within the slot 262. For example, such a connector may be a USB-C type of connector and/or another type of connector, which may be a male connector; noting that pogo-pins, etc., may be utilized for electrical connections. As an example, a connector within a socket may provide for one or more of power and/or data transmission and, for example, may help to physically stabilize an accessory received at least in part by the socket. For example, a planar portion of an accessory may be interference fit between opposing surfaces in the socket 262 while a female connector of the accessory is interference fit to the male connector 269. In such an example, multiple features can enhance stability of the accessory in the socket 262. Additionally, the male connector 269 may be protected by the wall(s) forming the socket 262 against inadvertent contact, debris, etc. As an example, the one or more sockets 250-1 and 250-2 of FIG. 1 may include a connector or connectors. For example, the one or more sockets 250-1 and 250-2 may include a male connector such as the male connector 269.

Figure 10:
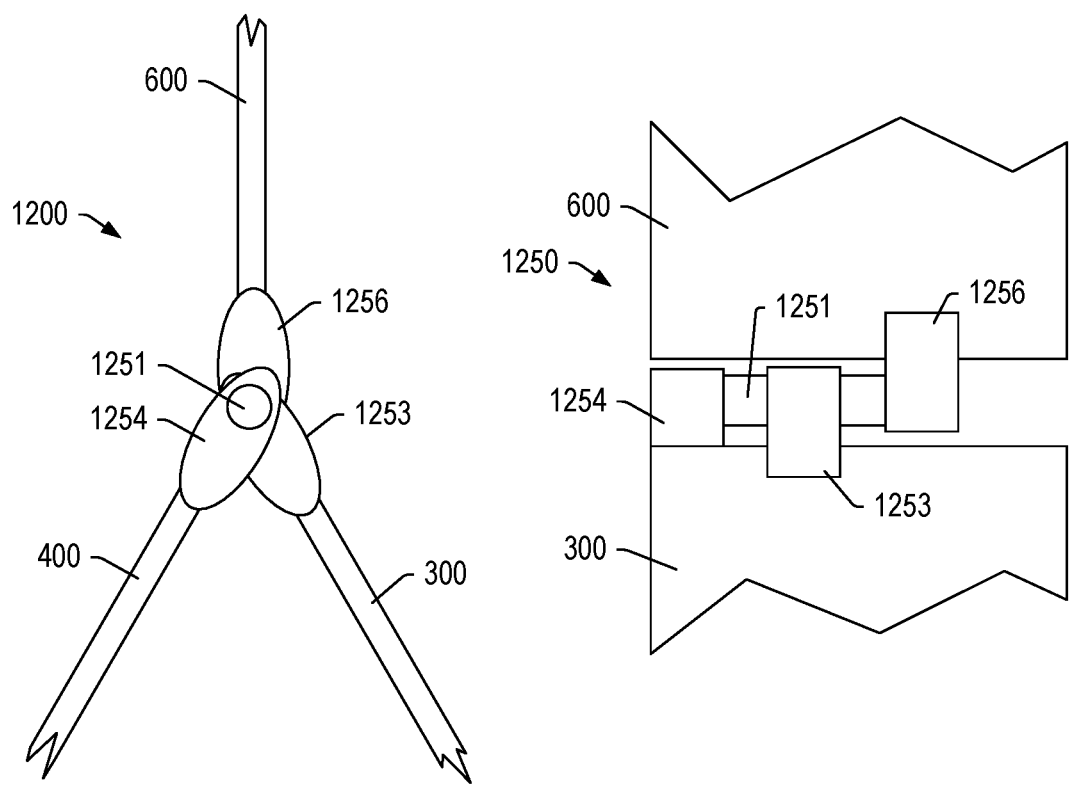
FIG. 10 is a series of views of an example of a portion of a hinge assembly.

FIG. 10 shows an example of a hinge assembly 1200 with respect to the display housing 300, the stand 400 and the display housing 600. As shown, the hinge assembly 1200 can include a portion 1250 that includes leafs 1253, 1254 and 1256 operatively coupled via an axle 1251. As an example, the leaf 1256 may be fixed or rotatable about the axle 1251, which can define an axis $\zeta$. In the example of FIG. 10, each of the leaves 1253 and 1254 can define a plane and the leaf 1256 can include an accessory socket that defines a plane. For example, the display housing 600 can be received by the accessory socket of the leaf 1256 to be oriented in a plane defined by the accessory socket. As explained with respect to the example accessory 860 of FIG. 8, an accessory may include a hinge assembly such that the accessory can be rotatable independent of rotation of the display housing 300 with respect to the stand 400.

Figure 11:
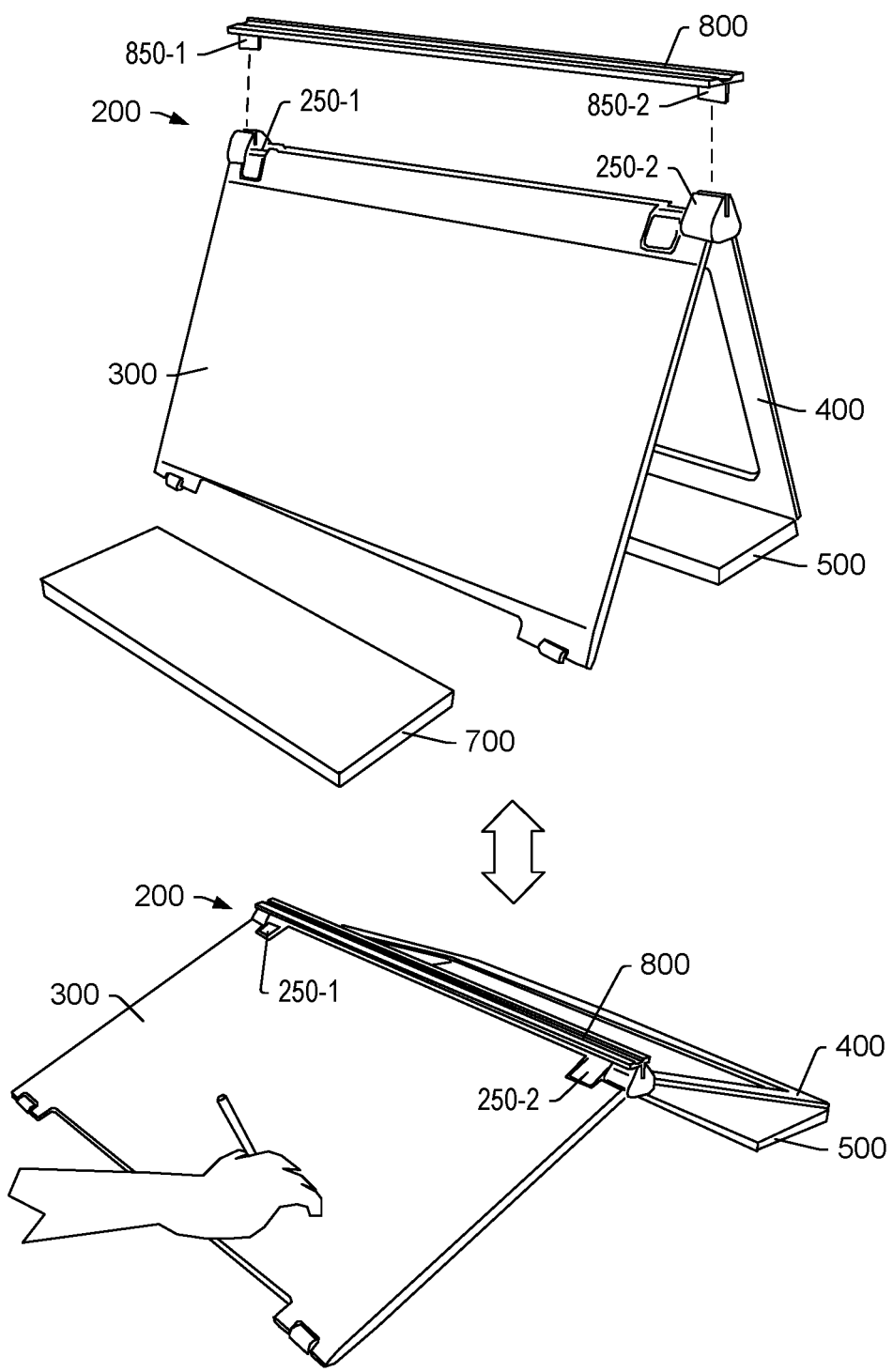
FIG. 11 is a series of perspective views of an example of a system and an example of a method.

FIG. 11 shows an example of the system 100 with the hinge assembly 200, the display housing 300, the stand 400 and optionally the component 500 where an accessory 800 can be received by sockets 250-1 and 250-2 of the hinge assembly 200, where one or more methods can include transitioning the system 100 using one or more features, the accessory 800, etc. As shown, the accessory 800 can include keys 805-1 and 805-2 that can be received by the sockets 250-1 and 250-2. In such an example, the accessory 800 can be a bridge that spans the sockets 250-1 and 250-2. As an example, a system may include multiple accessories where one accessory can fit into one socket and another accessory can fit into another socket. For example, consider a light accessory received by one socket and an HID accessory received by another socket.

Figure 12:
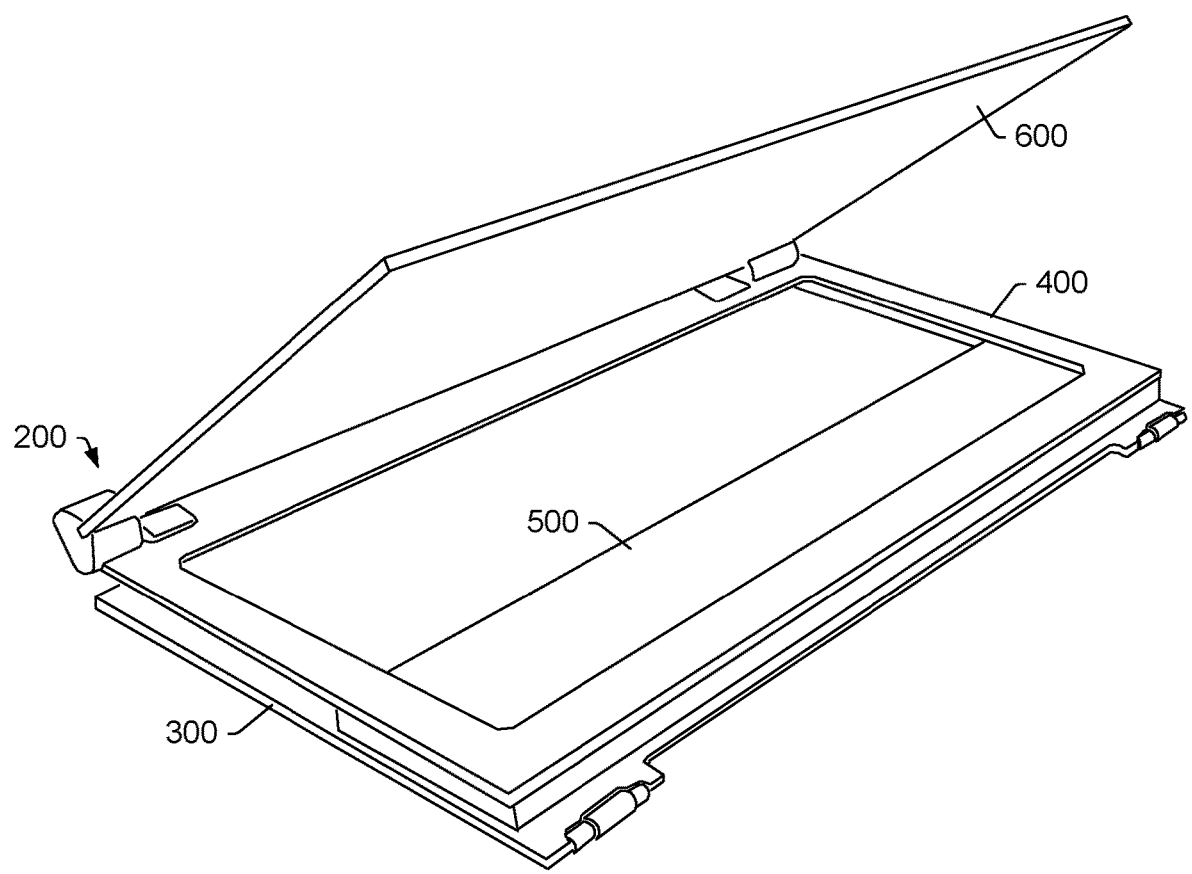
FIG. 12 is a perspective view of an example of a system.
Figure 13:
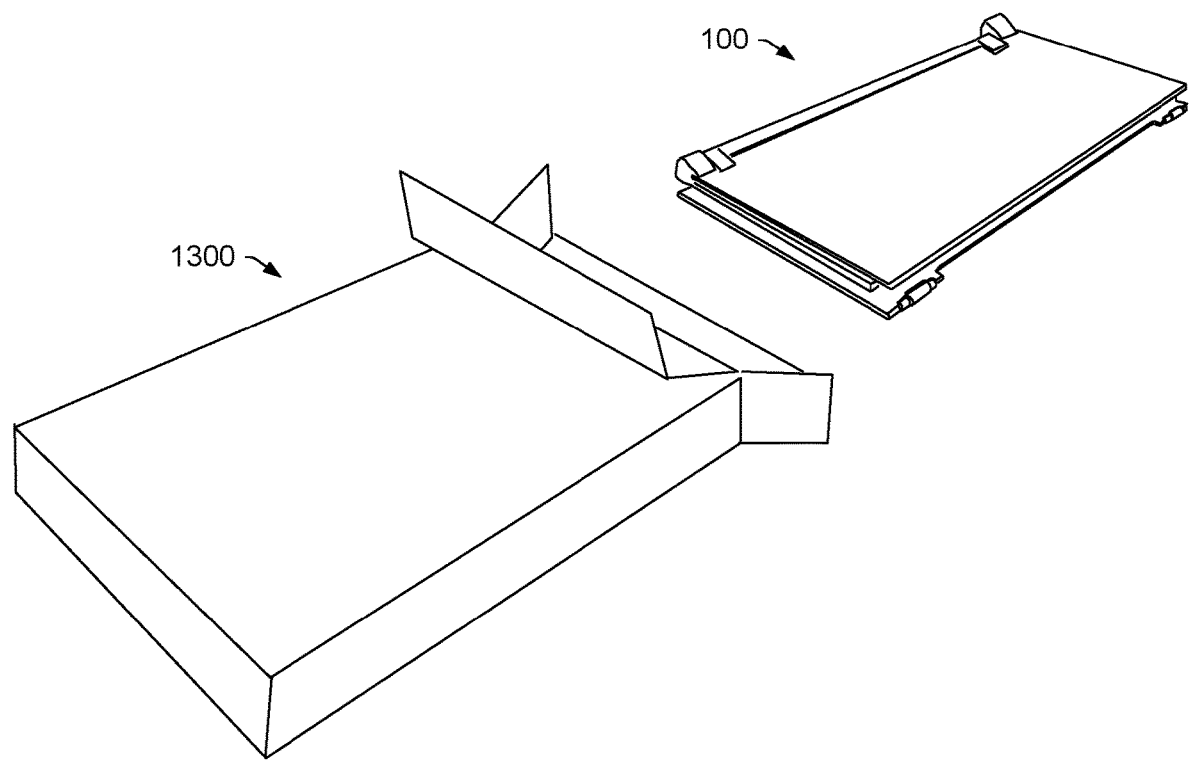
FIG. 13 is a perspective view of an example of a system and an example of packaging.

FIG. 12 shows an example of the system 100 in a transitional state to a folded orientation 109 as shown in FIG. 13 where the system 100 includes the hinge assembly 200, the display housing 300, the stand 400, the component 500 and the display housing 600. As an example, a space can exist in the folded orientation 109 where a keyboard housing such as the keyboard housing 700 may be received, for example, adjacent to the component 500 and between the display housings 300 and 600.

FIG. 13 shows the folded orientation 109 with respect to packaging 1300, which may be a box. As shown, the system 100 in the folded orientation 109 may be readily packaged in the packaging 1300, which may be rectangular with minimal excess space such that stacking can be optimized (e.g., for a number of packaged systems, etc.).

While FIG. 13 illustrates the packaging 1300, as an example, the system 100 may be transitioned to a folded orientation for transport, for example, in a case (e.g., a carrying case, a portfolio case, a backpack, etc.).

Figure 14A:
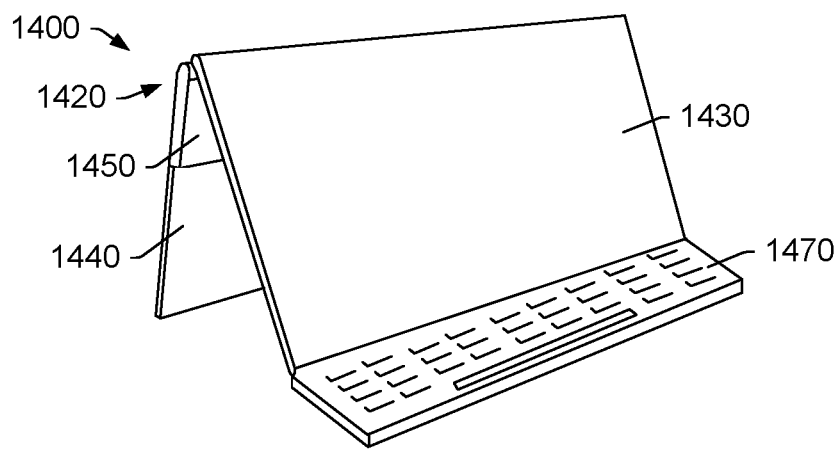
FIG. 14A, FIG. 14B and FIG. 14C are a series of perspective views of examples of systems.
Figure 14B:
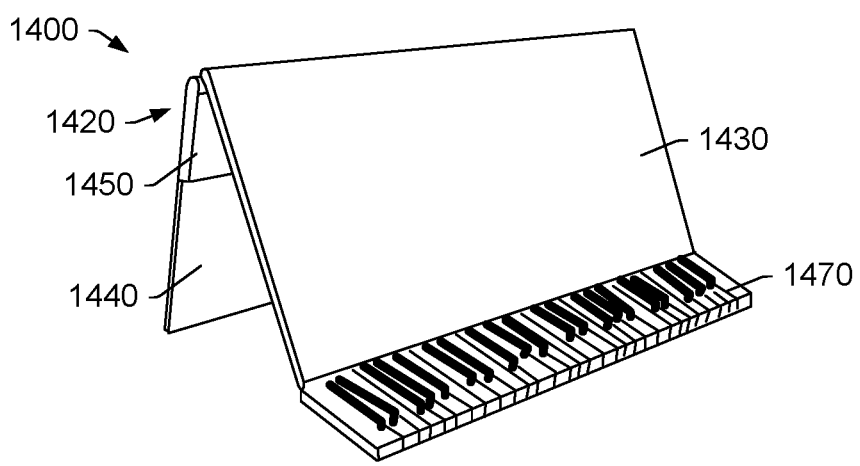
Figure 14C:
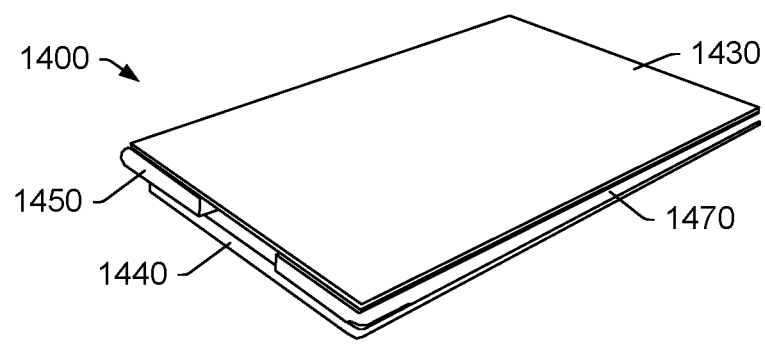

FIG. 14A, FIG. 14B and FIG. 14C show examples of a system 1400 that includes a hinge assembly 1420, a display housing 1430, and a stand 1440. As shown, the system 1400 can include one or more components that may be accessory components. For example, consider a component 1450 and/or a keyboard housing 1470, which may be for a typing keyboard (see FIG. 14A) or a musical keyboard (e.g., an electronic synthesizer keyboard, etc.) (see FIG. 14B). As an example, the component 1450 may include circuitry such as, for example, one or more of a processor, memory, a battery, etc. As shown in FIG. 14C, the system 1400 can be transitioned to a closed orientation where, for example, the component 1450 and the keyboard housing 1470 may be folded to be between the display housing 1430 and the stand 1440. In such an example, the display housing 1430 may include a hinge, magnets, etc., that can provide for coupling the keyboard housing 1470 to the display housing 1430. As an example, such coupling may include electronic coupling such that circuitry of the keyboard housing 1470 is operatively coupled to circuitry of one or more of the component 1450 and the display housing 1430.

Figure 15:
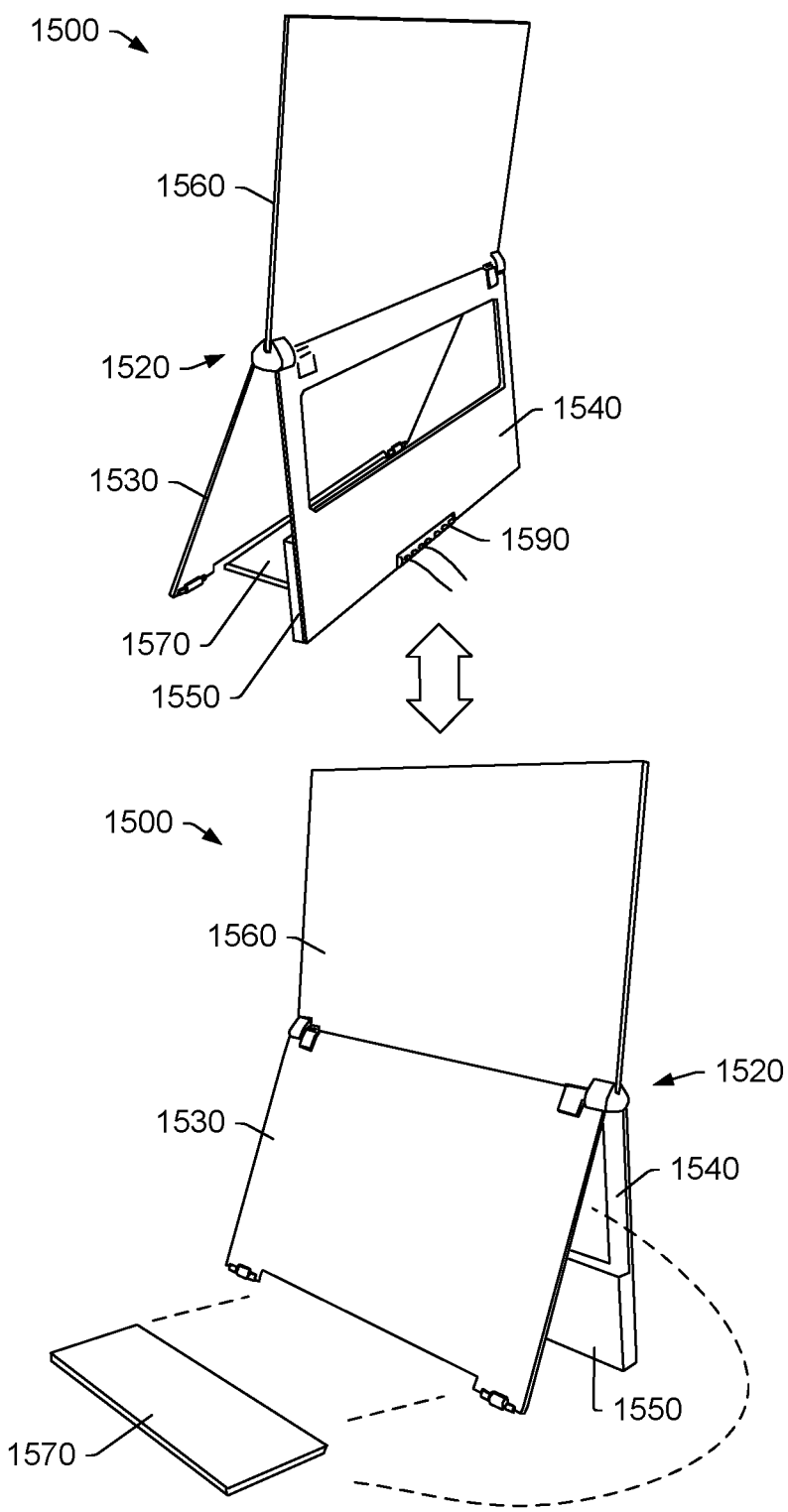
FIG. 15 is a series of perspective views of an example of a system and an example of a method.

FIG. 15 shows an example of a system 1500 that includes a hinge assembly 1520, a display housing 1530, a stand 1540, a component 1550, a display housing 1560, a keyboard housing 1570, and one or more connectors 1590. As shown, a space can be defined by at least the stand 1540 and the component 1550 that may be sized to receive the keyboard housing 1570, for example, for storage. As shown, in various orientations, where one or more methods may provide for transitioning between orientations (see, e.g., the double-headed arrow and dashed lines), the keyboard housing 1570 may be positioned in a space between a lower edge of the display housing 1530 and a lower edge of the stand 1540.

Figure 16:
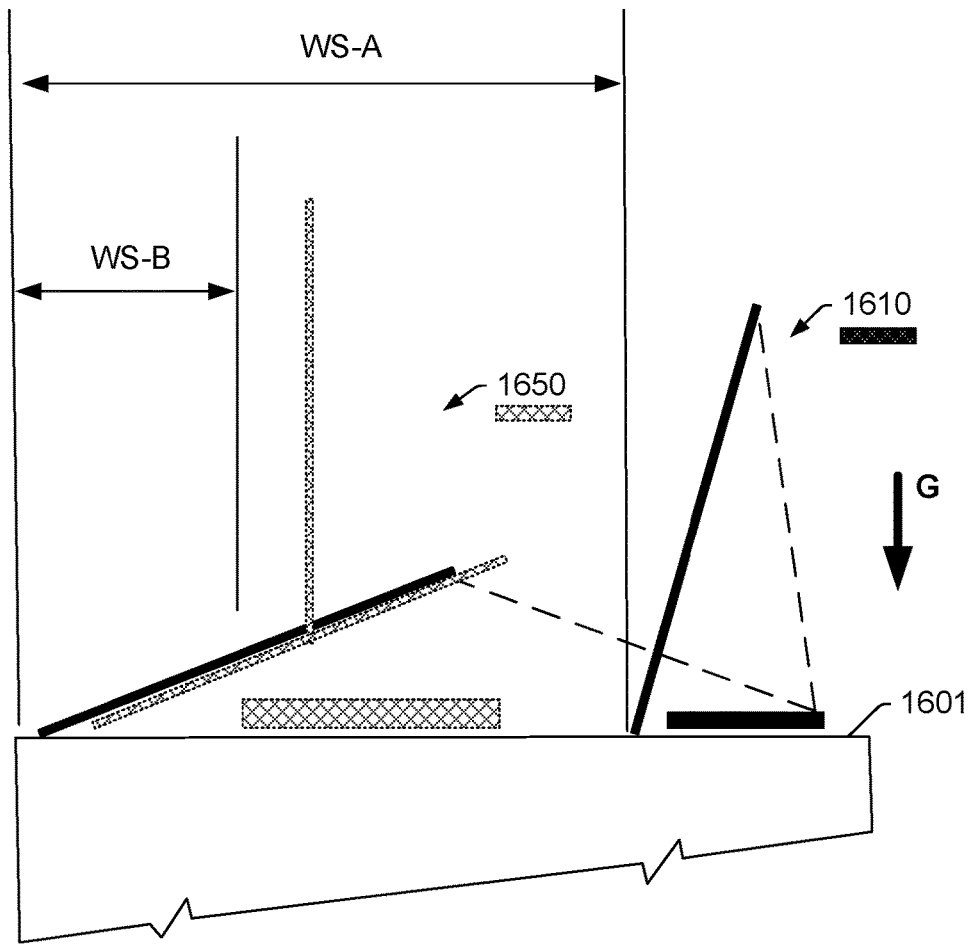
FIG. 16 is a series of views of an example of a system and another system.
Figure 16:
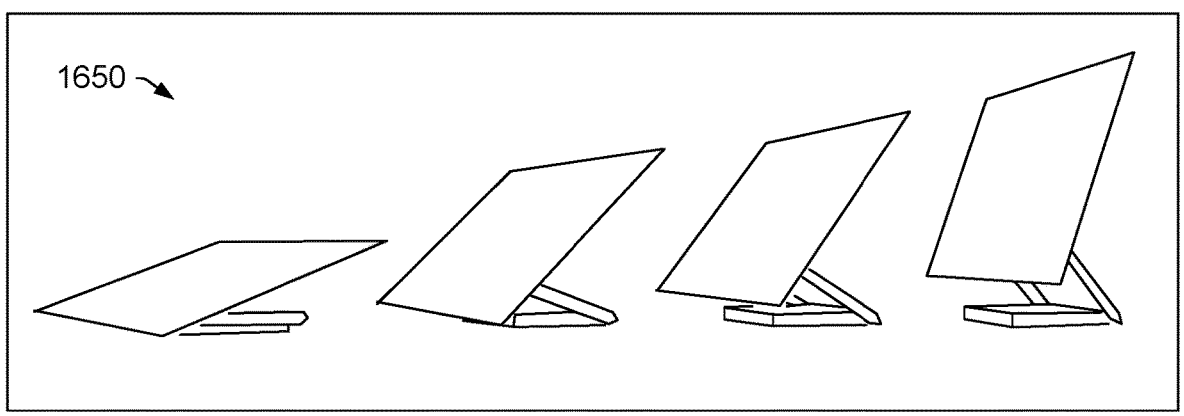

FIG. 16 shows an example of a system 1610 and a system 1650 on a support surface 1601, which may be a tabletop, a desktop, a countertop, etc. In the example of FIG. 16, the system 1610 may be a system such as the system 100 of FIG. 1 and the system 1650 may be an adjustable system with restricted orientations as shown in the four sequential perspective views. As shown, the support surface 1601 is planar and horizontal (e.g., gravity, G, is normal to the support surface 1601). As shown, the system 1610 can be oriented in an extended state or in a compact state and the system 1650 can be oriented in an extended state and in a compact state (see, e.g., leftmost perspective view and rightmost perspective view). Where the support surface 1601 is to be utilized for multiple tasks, the system 1610 can be positioned in the compact state to provide a workspace with a dimension WS-A while the system 1650 can be positioned in the compact state to provide a workspace WS-B where WS-B is less than WS-A. If a user wanted more workspace with the system 1650 to approach the amount of workspace WS-A, the user would have to shift the entire system 1650 to the right (e.g., towards the back) of the support surface 1601. And, then if the user wanted to utilize the workspace for a drawing mode of the system 1650, the user would have to shift the entire system 1650 to the left (e.g., towards the front) of the support surface 1601. In contrast, the system 1610 can provide for various workspace tasks using the support surface 1601 without having to reposition the entire system 1610.

As an example, in FIG. 16, the support surface may be approximately 71 cm (e.g., approx. 28 inches) from front to back, WS-B may be approximately 13.6 cm (e.g., approx. 5.375 inches) and WS-A may be approximately 51 cm (e.g., approx. 20 inches). Thus, WS-A can be at least 1.5 times greater than WS-B and, as shown in the example of FIG. 16, WS-A may be more than three times greater than WS-B. As indicated the system 1610 can provide a clean desk environment that can provide a workspace for performing multiple tasks.

As explained, a system can include various components that allow it to occupy more or less desk space. For example, the system 100 can include the display housing 300 and the stand 400 where a user may move the display housing 300 far enough back to provide a relatively large open desk space. As explained, the display housing 300 may include a cutout such that a keyboard can be readily moved back and forth under the display housing 300. As an example, a space defined by the display housing 300 and the stand 400 can be a tent like space that can be a storage space for one or more components, which may be or include one or more accessories. Such a space may be readily accessible to a user. As explained, where an accessory is another display housing, a dual display system may be provided where the accessory display housing does not take up room on a desk. Such an approach can help provide for a cleaner desktop with more task space. As explained, a dual display housing system may provide for movement of the two display housings in unison. For example, as a lower edge of one display housing is moved forward, the lower edge of the other display housing may move forward and down, for example, maintaining an angle thereof. In such an example, one user movement, which may be a one-handed or two-handed movement such as grabbing the lower display housing to pull the lower edge thereof forward on a desk surface, can provide for repositioning that display housing and another display housing.

As an example, the display housing 300 can be utilized in combination with the stand 400 to support one or more accessories via a hinge assembly that operatively couples the display housing 300 and the stand 400. As explained, the display housing 300 may be disposed at a desired angle, which may provide for a lower edge of the display housing 300 to reach forward. For example, consider a display housing that is sized such that it can occupy more than two-thirds of a 28 inch desk's depth. As an example, a display housing may be moved from a relatively low angle with respect to a desk surface (e.g., consider a 20 degree drawing angle) to a relatively high angle (e.g., consider a 70 degree angle), the latter of which may provide for clearing over two-thirds of a 28 inch desk's surface, for example, for a user to perform one or more other tasks (e.g., consider eating a meal, handling a prototype, papers, a book, a magazine, etc.). As explained, a stand may be coupled to a housing that may include circuitry such as, for example, a processor, memory, etc. In such an example, the housing may be relatively flat and provide an upper surface for storage of one or more components thereon (e.g., a keyboard, a mouse, etc.).

As an example, a system can include two display housings where one is effectively positioned such that it is at the top of the other display housing where, as explained, the two display housing may move in unison when the lower display housing is moved forwards or backwards. As explained, as a lower display housing moves forward and angles down (e.g., for drawing thereon, etc.), the upper display housing can move forward in space, for example, while maintaining a fixed angle with respect to a desk surface. In other words, the upper display housing is not left back in space, which may make it more difficult for a user to see (e.g., to discern details rendered to a display thereof); rather, the upper display can also be brought forward and downward in height, noting that a drawing task may involve a user moving her body downward somewhat as well such that the user's eyes can glance at the upper display housing without strain, moving the neck, etc. For example, if a user moved the lower display housing forward to a low angle for drawing and the upper display housing remained stationary without moving closer to the user, and then the user hunched downward for drawing using the lower display housing, the upper display housing may be hard for a user to see. For example, a user in the hunched down position may have to strain her eyes or move her neck to see the upper display housing; whereas, if the upper display housing moves forward and downward, then the user, in the hunched down position, may merely gaze slightly upward without strain or moving her neck to see what is rendered to a display surface of the upper display housing while being able to maneuver a stylus on a display surface of the lower display housing. Whether a hunched down position is or is not ergonomically optimal, a user's head may be closer to the user's drawing hand and hence closer to a drawing surface, which may be a display surface of a touch and/or stylus enabled display. In such a position, where another display is positioned facing forward proximate to a hinge edge of the drawing-enabled display, it may be more readily glanced at and viewed than if the other display were positioned higher and further back.

As explained, a dual display housing system may be utilized for performing one or more types of tasks. As mentioned, one type of task may be a drawing task, which may involve content creation, content editing, etc., where a relatively low angle is desirable. As an example, a user may transition a system from a drawing orientation to another orientation, with a desirable higher angle, which can act to expose a portion of a work surface (e.g., a desktop, a tabletop, a countertop, etc.). In such an example, consider a text document being rendered to a lower display and an Internet browser (e.g., a research webpage, etc.) being rendered to the upper display.

While various drawing types of tasks may be performed using multiple display housings, as explained, a system may include a single display housing and one or more accessory sockets, where the single display housing may be oriented suitable for drawing types of tasks (e.g., or other tasks). For example, FIGS. 4A, B, C, D, E and F show various examples of accessories, some of which do not include a display as an accessory (e.g., an accessory display such as in FIG. 4F). As an example, a system may provide a dual display drawing mode and a single display drawing mode where the single display drawing mode can include using one or more non-display accessories. For example, the accessory 820 can include a HID suitable for navigating one or more menus of a drawing application (e.g., or other content creation and/or editing application). As an example, an accessory may be an accessory bridge, which may be an intermediate component that provides for utilization of one or more accessories.

As an example, a system can include a display housing that includes a display with a diagonal dimension in a range of approximately 25 cm to approximately 150 cm. As an example, where a user has a desk with a depth of approximately 60 cm to approximately 100 cm, a system may include a display housing that includes a display with a diagonal dimension in a range of approximately 60 cm to approximately 100 cm. For example, a system may be matched to a desk size where orientations of the system may provide for use of most of the depth of the desk and for clearing about two-thirds of the depth of the desk, which may provide work space for one or more non-system tasks, etc. In a relatively low angle orientation, a lower edge of a display housing may approach a front edge of a desk, which may make the display housing akin to a drawing table (e.g., as utilized by a draftsperson). In such an example, space in front of the lower edge of the display housing may not be required by a user as the user can hunch over the display housing to more finely control stylus movements.

As an example, a system can include a display housing that includes a planar display; a planar stand; and a hinge assembly that operatively couples the display housing and the planar stand and that includes an accessory socket that defines a plane that is maintained fixed for rotation of the display housing with respect to the planar stand.

As shown in the example of FIG. 1, the hinge assembly 200 can include the one or more sockets 250-1 and 250-2 as one or more accessory sockets that can receive one or more accessories. In the example of FIG. 1, the display housing 600 is an accessory where, when received in the one or more sockets 250-1 and 250-2, which define a plane, the display housing 600 may be maintained fixed in the plane for rotation of the display housing 300 with respect to the planar stand 400. In such an example, the one or more sockets 250-1 and 250-2 may be moved forward or backwards and/or upward or downward, however, the plane defined by the one or more sockets 250-1 and 250-2 can remain in a fixed orientation with respect to the hinge assembly 200 itself.

In the example of FIG. 9, the socket body 260 includes features that allow for independent adjustment of a plane defined by a socket 262. In such an example, the orientation of the socket 262 can be adjusted independent of the hinge assembly 200. For example, if a user desires adjusting the angle of an accessory, the user may do so without adjusting an angle between the display housing 300 and the stand 400. And, if a user desires adjusting an angle between the display housing 300 and the stand 400, the user may do so without adjusting an angle of the socket 262. In the example of FIG. 9, the socket 262 can be an adjustable socket that can be adjustable about an axis of rotation. For example, consider adjustments within a range of angles from vertical from approximately minus 90 degrees to approximately plus 90 degrees. Where a hinge assembly includes multiple accessory sockets that are adjustable, a user may adjust one socket to one angle and another socket to another angle. For example, consider two accessories where each accessory is fit into a corresponding accessory socket where angles of the accessory sockets may be independently adjustable. Where a single accessory is received in multiple accessory sockets, where the multiple accessory sockets are adjustable, movement of the single accessory may adjust the adjustable accessory sockets according to a common angle. For example, consider the display housing 600 of FIG. 1 being received by the sockets 250-1 and 250-2 where each of such sockets may be configured the adjustable socket 262. In such an example, where a user may move the display housing 600 in a manner that causes both of the sockets 250-1 and 250-2 to adjust simultaneously according to a common angle.

As an example, a hinge assembly can be a three-plane hinge assembly, where, for example, a planar display defines a first plane, a planar stand defines a second plane and a plane of an accessory socket defines a third plane.

As an example, an accessory socket of a hinge assembly can be a first accessory socket where the hinge assembly includes a second accessory socket. As an example, a hinge assembly may be provided as separate sub-assemblies, which may include, for example, a left sub-assembly and a right sub-assembly. As an example, one or more intermediate sub-assemblies may be provided (e.g., consider a central sub-assembly, etc.).

As an example, a display housing can be a first display housing and a planar display thereof can be a first planar display where a system can include a second display housing that includes a second planar display, where the second display housing is an accessory receivable via one or more accessory sockets to orient the second planar display in a plane of the one or more accessory sockets.

As mentioned, an accessory socket may be rotatable independent of rotation of a display housing with respect to a planar stand.

As an example, a system can include circuitry where an accessory socket includes at least one electrical contact operatively coupled to the circuitry. In such an example, the at least one electrical contact can include at least one of an electrical power contact and an electrical data contact. For example, consider one or more of the sockets 250-1, 250-2 and 262 as including a male connector and/or a female connector. As an example, consider a male USB-C type connector or a female USB-C type connector. As an example, an accessory may include one or more female connectors and/or one or more male connectors. For example, consider an accessory that includes a female connector that can connect to a male connector of a socket. In such an example, the male connector may be disposed within a socket and be received by a female connector of an accessory once the accessory is coupled to the socket (see, e.g., the male connector 269 of FIG. 9). For example, consider USB-C type connectors, which may provide for power and/or data. As an example, the display housing 600 may include one or more USB-C types of connectors, which may be, for example, female connectors such that the edge 602 of the display housing 600 can be relatively straight, without extending features. In the example of FIG. 1, a male connector may be hidden in one of the one or more sockets 250-1 and 250-2, which can help protect the male connector from inadvertent contact, debris, etc. As an example, a connector of an accessory socket may help to stabilize an accessory physically within the accessory socket and provide for transmission of power and/or data.

As an example, a display housing can include a hinge edge and an opposing edge, where the opposing edge includes at least one anti-friction component. For example, consider the at least one anti-friction component including a roller, which may be, for example, a cylindrical roller supported by one or more axles (e.g., pins, etc.). As mentioned, a display housing may include a locking mechanism that can contact a roller to hinder rotation of the roller (see, e.g., the locking mechanism 303 of the example display housing 300 of FIG. 1).

As an example, a display housing can include a hinge edge and an opposing edge, where the opposing edge includes feet and a cutout disposed between the feet. In such an example, the feet may include friction feet and/or anti-friction feet. As an example, a hinge assembly can include friction components that apply a friction force that maintains a rotational angle between a display housing and a stand. For example, consider one or more components disposed on an axle where the axle may be threaded to receive a nut. In such an example, tightening of the nut on the axle may cause contact between one or more components where movement results in frictional force. Where the frictional force required for movement is greater than a gravitational force that may otherwise cause movement, the hinge assembly may maintain an orientation of components under the influence of the gravitational force.

As an example, a system can include a rotational angle between a planar stand and a display housing that is within a range defined by a minimum angle greater than or equal to 0 degrees and a maximum angle less than or equal to 180 degrees.

As an example, a system can include a keyboard housing that includes a keyboard. In such an example, a display housing can include a hinge edge and an opposing edge, where the opposing edge includes a cutout wherein a dimension of the cutout is greater than a thickness of the keyboard housing.

As an example, a system can include an audio speaker accessory receivable via one or more accessory sockets of a hinge assembly. As an example, a system can include a light accessory receivable via one or more accessory sockets of a hinge assembly. As an example, a system can include a human input device (HID) accessory receivable via one or more accessory sockets of a hinge assembly. As an example, a system can include a mobile device accessory receivable via one or more accessory sockets of a hinge assembly. For example, consider a smartphone as an accessory.

As an example, a system can include a planar stand that includes opposing edges and a hinge assembly disposed between the opposing edges that defines an upper planar portion and a lower planar portion of the planar stand. In such an example, the upper planar portion and the lower planar portion may be oriented about the hinge assembly to define two planes with respect to an axis of the hinge assembly. For example, FIG. 6 shows an example of the planar stand 400 as including one or more hinges 483-1 and 483-2 such that the planar stand 400 can kneel. For example, if the lower portion is considered a lower leg, the hinge 483-1 is considered a knee, and the upper portion is considered an upper leg, then one or more kneeling positions may be utilized, including upright kneeling (e.g., the orientation 104) and sitting kneeling (e.g., the orientation 105).

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 17:
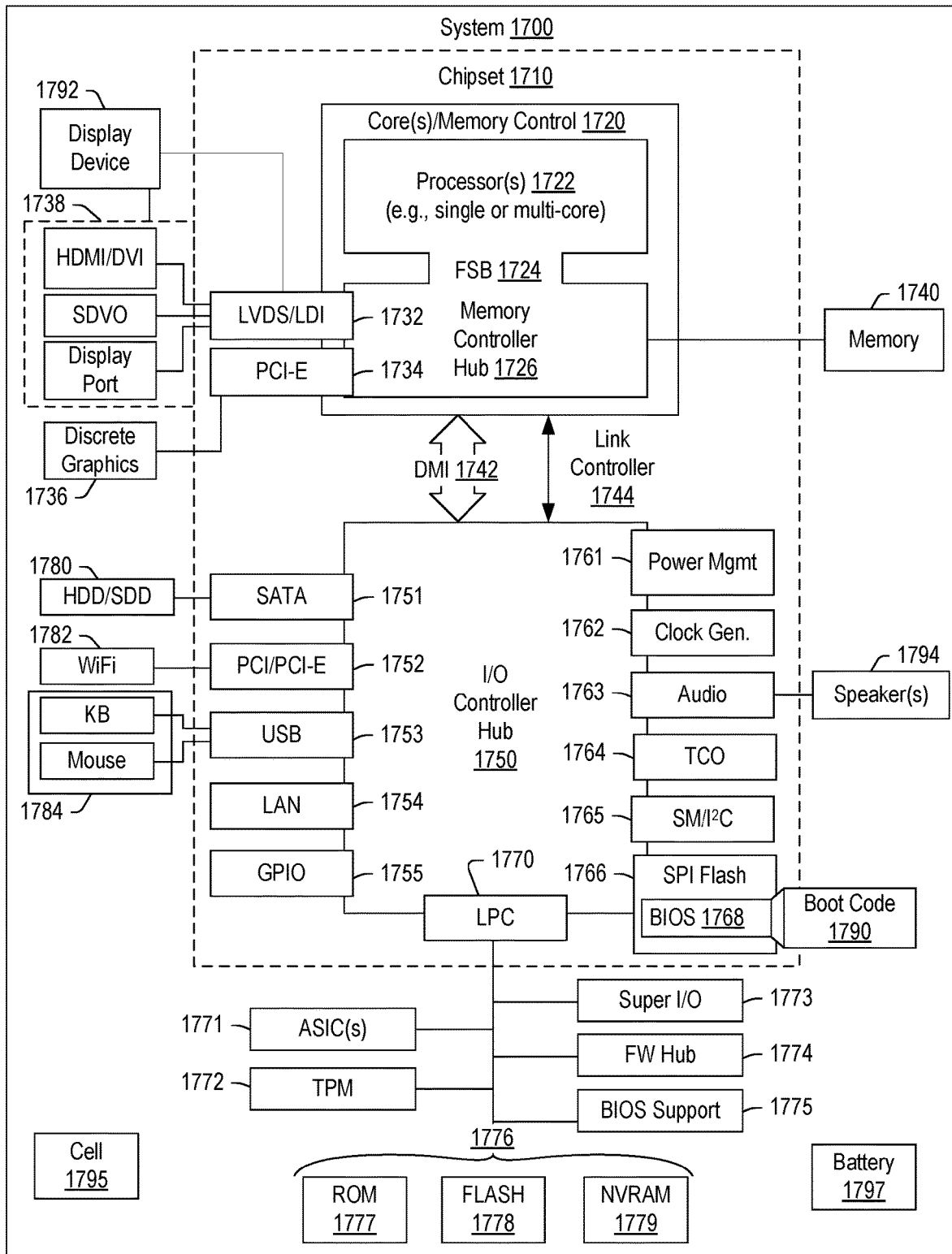
FIG. 17 is a diagram of an example of a system.

While various examples of circuits or circuitry have been discussed, FIG. 17 depicts a block diagram of an illustrative computer system 1700. The system 1700 may be a desktop computer system, such as one of the THINKCENTRE® or THINKPAD® series of personal computers sold by Lenovo (US) Inc. of Morrisville, N.C., or a workstation computer, such as the THINKSTATION®, which are sold by Lenovo (US) Inc. of Morrisville, N.C.; however, as apparent from the description herein, a display device or other machine may include other features or only some of the features of the system 1700. As an example, a device dock, a support of a device dock, etc., may include one or more of the components illustrated in the computer system 1700. As explained, a device dock and/or a support can include circuitry, which may include one or more batteries (e.g., one or more lithium-ion batteries, etc.).

As an example, a monitor or display may include features such as one or more of the features included in one of the LENOVO® IDEACENTRE® or THINKCENTRE® "all-in-one" (AIO) computing devices (e.g., sold by Lenovo (US) Inc. of Morrisville, N.C.). For example, the LENOVO® IDEACENTRE® A720 computing device includes an Intel® Core i7 processor, a 27 inch frameless multi-touch display (e.g., for HD resolution of 1920×1080), a NVIDIA® GeForce® GT 630M 2 GB graphics card, 8 GB DDR3 memory, a hard drive, a DVD reader/writer, integrated Bluetooth® and 802.11b/g/n Wi-Fi®, USB connectors, a 6-in-1 card reader, a webcam, HDMI in/out, speakers, and a TV tuner.

As shown in FIG. 17, the system 1700 includes a so-called chipset 1710. A chipset refers to a group of integrated circuits, or chips, that are designed to work together. Chipsets are usually marketed as a single product (e.g., consider chipsets marketed under the brands INTEL®, AMD®, etc.).

In the example of FIG. 17, the chipset 1710 has a particular architecture, which may vary to some extent depending on brand or manufacturer. The architecture of the chipset 1710 includes a core and memory control group 1720 and an I/O controller hub 1750 that exchange information (e.g., data, signals, commands, etc.) via, for example, a direct management interface or direct media interface (DMI) 1742 or a link controller 1744. In the example of FIG. 17, the DMI 1742 is a chip-to-chip interface (sometimes referred to as being a link between a "northbridge" and a "southbridge").

The core and memory control group 1720 include one or more processors 1722 (e.g., single core or multi-core) and a memory controller hub 1726 that exchange information via a front side bus (FSB) 1724. As described herein, various components of the core and memory control group 1720 may be integrated onto a single processor die, for example, to make a chip that supplants the conventional "northbridge" style architecture.

The memory controller hub 1726 interfaces with memory 1740. For example, the memory controller hub 1726 may provide support for DDR SDRAM memory (e.g., DDR, DDR2, DDR3, etc.). In general, the memory 1740 is a type of random-access memory (RAM). It is often referred to as "system memory".

The memory controller hub 1726 further includes a low-voltage differential signaling interface (LVDS) 1732. The LVDS 1732 may be a so-called LVDS Display Interface (LDI) for support of a display device 1792 (e.g., a CRT, a flat panel, a projector, etc.). A block 1738 includes some examples of technologies that may be supported via the LVDS interface 1732 (e.g., serial digital video, HDMI/DVI, display port). The memory controller hub 1726 also includes one or more PCI-express interfaces (PCI-E) 1734, for example, for support of discrete graphics 1736. Discrete graphics using a PCI-E interface has become an alternative approach to an accelerated graphics port (AGP). For example, the memory controller hub 1726 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1750 includes a variety of interfaces. The example of FIG. 17 includes a SATA interface 1751, one or more PCI-E interfaces 1752 (optionally one or more legacy PCI interfaces), one or more USB interfaces 1753, a LAN interface 1754 (more generally a network interface), a general purpose I/O interface (GPIO) 1755, a low-pin count (LPC) interface 1770, a power management interface 1761, a clock generator interface 1762, an audio interface 1763 (e.g., for speakers 1794), a total cost of operation (TCO) interface 1764, a system management bus interface (e.g., a multi-master serial computer bus interface) 1765, and a serial peripheral flash memory/controller interface (SPI Flash) 1766, which, in the example of FIG. 17, includes BIOS 1768 and boot code 1790. With respect to network connections, the I/O hub controller 1750 may include integrated gigabit Ethernet controller lines multiplexed with a PCI-E interface port. Other network features may operate independent of a PCI-E interface.

The interfaces of the I/O hub controller 1750 provide for communication with various devices, networks, etc. For example, the SATA interface 1751 provides for reading, writing or reading and writing information on one or more drives 1780 such as HDDs, SDDs or a combination thereof. The I/O hub controller 1750 may also include an advanced host controller interface (AHCI) to support one or more drives 1780. The PCI-E interface 1752 allows for wireless connections 1782 to devices, networks, etc. The USB interface 1753 provides for input devices 1784 such as keyboards (KB), one or more optical sensors, mice and various other devices (e.g., microphones, cameras, phones, storage, media players, etc.). On or more other types of sensors may optionally rely on the USB interface 1753 or another interface (e.g., I²C, etc.). As to microphones, the system 1700 of FIG. 17 may include hardware (e.g., audio card) appropriately configured for receipt of sound (e.g., user voice, ambient sound, etc.).

In the example of FIG. 17, the LPC interface 1770 provides for use of one or more ASICs 1771, a trusted platform module (TPM) 1772, a super I/O 1773, a firmware hub 1774, BIOS support 1775 as well as various types of memory 1776 such as ROM 1777, Flash 1778, and non-volatile RAM (NVRAM) 1779. With respect to the TPM 1772, this module may be in the form of a chip that can be used to authenticate software and hardware devices. For example, a TPM may be capable of performing platform authentication and may be used to verify that a system seeking access is the expected system.

The system 1700, upon power on, may be configured to execute boot code 1790 for the BIOS 1768, as stored within the SPI Flash 1766, and thereafter processes data under the control of one or more operating systems and application software (e.g., stored in system memory 1740). An operating system may be stored in any of a variety of locations and accessed, for example, according to instructions of the BIOS 1768. Again, as described herein, a satellite, a base, a server or other machine may include fewer or more features than shown in the system 1700 of FIG. 17. Further, the system 1700 of FIG. 17 is shown as optionally include cell phone circuitry 1795, which may include GSM, CDMA, etc., types of circuitry configured for coordinated operation with one or more of the other features of the system 1700.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
    a display housing that comprises a planar display;
    a planar stand;
    a keyboard housing that comprises a keyboard; and
    a hinge assembly that operatively couples the display housing and the planar stand and that comprises an accessory socket that defines a plane that is maintained fixed for rotation of the display housing with respect to the planar stand, wherein the display housing comprises a hinge edge and an opposing edge, wherein the opposing edge comprises a cutout wherein a dimension of the cutout is greater than a thickness of the keyboard housing.

2. The system of claim 1, wherein the hinge assembly is a three-plane hinge assembly, wherein the planar display defines a first plane, the planar stand defines a second plane and the plane of the accessory socket defines a third plane.

3. The system of claim 1, wherein the accessory socket is a first accessory socket and comprising a second accessory socket.

4. The system of claim 1, wherein the display housing is a first display housing and wherein the planar display is a first planar display and comprising a second display housing that comprises a second planar display, wherein the second display housing is an accessory receivable via the accessory socket to orient the second planar display in the plane of the accessory socket.

5. The system of claim 1, wherein the accessory socket is rotatable independent of rotation of the display housing with respect to the planar stand.

6. The system of claim 1, comprising circuitry wherein the accessory socket comprises at least one electrical contact operatively coupled to the circuitry.

7. The system of claim 6, wherein the at least one electrical contact comprises at least one of an electrical power contact and an electrical data contact.

8. The system of claim 1, wherein the opposing edge comprises at least one anti-friction component.

9. The system of claim 8, wherein the at least one anti-friction component comprises a roller.

10. The system of claim 1, wherein the opposing edge comprises feet and the cutout is disposed between the feet.

11. The system of claim 10, wherein the feet comprise anti-friction feet.

12. The system of claim 11, wherein the hinge assembly comprises friction components that apply a friction force that maintains a rotational angle between the display housing and the stand.

13. The system of claim 1, wherein a rotational angle between the planar stand and the display housing is within a range defined by a minimum angle greater than or equal to 0 degrees and a maximum angle less than or equal to 180 degrees.

14. The system of claim 1, comprising an audio speaker accessory receivable via the accessory socket.

15. The system of claim 1, comprising a light accessory receivable via the accessory socket.

16. The system of claim 1, comprising a human input device accessory receivable via the accessory socket.

17. The system of claim 1, comprising a mobile device accessory receivable via the accessory socket.

18. The system of claim 1, wherein the planar stand comprises opposing edges and a hinge assembly disposed between the opposing edges that defines an upper planar portion and a lower planar portion of the planar stand.

19. A system comprising:
a display housing that comprises a planar display, a hinge edge and an opposing edge;
a planar stand that comprises a hinge edge and an opposing edge; and
a hinge assembly that operatively couples the hinge edge of the display housing and the hinge edge of the planar stand, wherein the hinge assembly comprises a display housing gear body and axle, a planar stand gear body and axle, and an accessory socket body that couples to each of the axles to fix an orientation of the accessory socket body, and wherein the orientation of the accessory socket body remains fixed for synchronous meshed rotation of gears of the gear bodies of the display housing and the planar stand.

20. The system of claim 19, wherein the accessory socket body comprises a base portion and a rotatable portion, wherein the rotatable portion comprises an accessory socket.

* * * * *